US012762296B1

(12) United States Patent
Tuluie et al.

(10) Patent No.: US 12,762,296 B1
(45) Date of Patent: Oct. 13, 2026

(54) SYSTEMS AND METHODS FOR OPTIMIZING THE ARRANGEMENT OF WIND TURBINES IN A WIND FARM

(71) Applicant: PhysicsX Limited, Bicester (GB)

(72) Inventors: Robin Tuluie, Oxfordshire (GB); Nicolas Haag, Oxford (GB)

(73) Assignee: PhysicsX Limited, Bicester (GB)

( * ) Notice: Subject to any disclaimer, the term of this patent is extended or adjusted under 35 U.S.C. 154(b) by 860 days.

(21) Appl. No.: 18/131,478

(22) Filed: Apr. 6, 2023

Related U.S. Application Data

(60) Provisional application No. 63/404,045, filed on Sep. 6, 2022, provisional application No. 63/328,276, filed on Apr. 7, 2022.

(51) Int. Cl.

| | |
|---|---|
| ***G06F 30/13*** | (2020.01) |
| ***F03D 80/00*** | (2016.01) |
| ***G06F 30/27*** | (2020.01) |
| ***G06F 30/28*** | (2020.01) |
| *G06F 113/06* | (2020.01) |

(52) U.S. Cl.
CPC ............. *G06F 30/13* (2020.01); *F03D 80/00* (2016.05); *G06F 30/27* (2020.01); *G06F 30/28* (2020.01); *F05B 2260/84* (2013.01); *F05B 2270/1033* (2013.01); *G06F 2113/06* (2020.01)

(58) Field of Classification Search
CPC .......... G06F 30/13; G06F 30/27; G06F 30/28; F03D 80/00
See application file for complete search history.

(56) References Cited

U.S. PATENT DOCUMENTS

2010/0138201 A1* 6/2010 Gundling ................ F03D 7/043 703/9
2019/0203696 A1* 7/2019 Kaucic .................... F03D 7/046
2021/0312101 A1* 10/2021 Murcia .................... F03D 13/30
2023/0237208 A1* 7/2023 Malisani ................. G06F 30/13 703/18

(Continued)

OTHER PUBLICATIONS

Parada et al., "Wind farm layout optimization using a Gaussian-based wake model" Renewable Energy, vol. 107, Jul. 2017, pp. 531-541 [retrieved from https://www.sciencedirect.com/science/article/pii/S0960148117300952] (Year: 2017).*

(Continued)

*Primary Examiner* — Brian W Wathen
(74) *Attorney, Agent, or Firm* — Alan D. Minsk; FisherBroyles, LLP

(57) ABSTRACT

Systems, apparatuses, and methods for optimizing the layout or siting of a set of wind turbines in a wind farm. Embodiments optimize the specifications of a structure in situations in which the structure is operated when placed into a fluid or gas flow. Further, embodiments optimize the arrangement and/or operational conditions of an ensemble of such optimized structures (or of a set of deployable turbines with associated configurations) to maximize a performance metric or similar constraint. For a wind farm comprised of an ensemble of wind turbines, the operational condition may be that of maximizing output of the wind farm subject to a specified set of environmental conditions at a wind farm site and a set of wind turbine specifications or configurations.

20 Claims, 15 Drawing Sheets

(56) References Cited

U.S. PATENT DOCUMENTS

2024/0054267 A1* 2/2024 Qvist ...................... G06F 30/27

OTHER PUBLICATIONS

Kuo et al., "Wind farm layout optimization on complex terrains—Integrating a CFD wake model with mixed-integer programing" Applied Energy, vol. 178, Sep. 15, 2016, pp. 404-414 [retrieved from https://www.sciencedirect.com/science/article/pii/S0306261916308595]. (Year: 2016).*

Zhang et al., "Wind farm wake modeling based on deep convolutional conditional generative adversarial network" (Jan. 1, 2022), Energy, vol. 238, Part B, pp. 1-15 (Year: 2022).*

* cited by examiner

Single Wind Turbine Surrogate Training Flowchart

Validation of Surrogate Result with CFD/CAE

Method Description

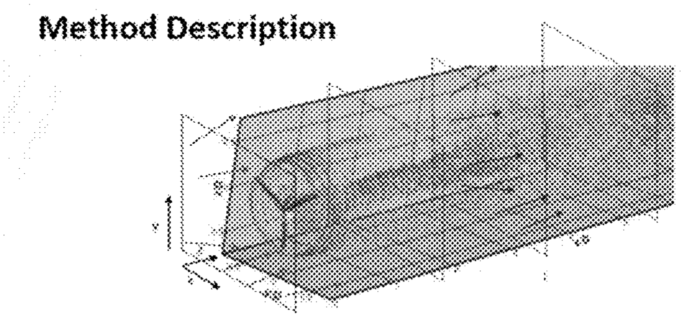

Upstream velocity vector field V(x,y,z) and pressure field P(x,y,z) in the chosen volume placed just ahead of the wind turbine, or alternatively (2) the volume may be just a thin slice, i.e. a window with V(x,y) and P(x,y)

Downstream velocity vector fields V(x,y,z) and pressure fields P(x,y,z), or alternatively (2) Vi(x,y) and pressure fields Pi(x,y) in the ith window behind the wind turbine.

Inputs used for Surrogate training:
- Upstream V(x,y,z) or V(x,y) and P(x,y,z) or P(x,y)
- Turbine heading angle
- Turbine blade pitch angle
- Turbine motor torque
- Air temperature and density
- At times terrain geometry and turbine height Outputs used for Surrogate training:
- Wake V(x,y,z) or Vi(x,y) and P(x,y,z) or P(x,y)
- Turbine speed (as a direct result of input velocity field the above inputs)

CFD runs generate the training data for a variety of flow fields and turbine torques and angles. The turbine design is held fixed. Once one good turbine surrogate model is obtain, it can be deployed across a number of different locations in the same wind farm, as a surrogate.

Figure 6

SYSTEMS AND METHODS FOR OPTIMIZING THE ARRANGEMENT OF WIND TURBINES IN A WIND FARM

CROSS REFERENCE TO RELATED APPLICATIONS

This application claims the benefit of U.S. Provisional Application No. 63/328,276, entitled "Wind Farm Surrogate," filed Apr. 7, 2022, and of U.S. Provisional Application No. 63/404,045, entitled "Systems and Methods for Optimizing the Arrangement of Wind Turbines in a Wind Farm," filed Sep. 6, 2022, the disclosures of which are incorporated in their entirety by this reference.

BACKGROUND

Wind energy, typically captured by a wind turbine that converts wind-caused motion into electrical power is an important aspect of meeting the energy needs and serves as an alternative to coal generated or nuclear power. Converting wind motion to power is typically cleaner and safer than other sources and along with solar power is viewed as an alternative or supplement to conventional sources of power.

A wind farm or wind park (also referred to as a wind power station or wind power plant), is a group of wind turbines in the same location used to produce electricity. Wind farms vary in size from a small number of turbines to several hundred wind turbines covering an extensive area. Wind farms can be either onshore or offshore, and the location is critical to the success of a wind farm. Conditions contributing to a successful wind farm location include wind conditions, access to electric transmission, physical access, and local electricity prices.[1]

[1] Sections of this and other paragraphs in the background are paraphrased from the Wikipedia entry for "Wind farm".

The faster the average wind speed, the more electricity a wind turbine will generate, so faster winds are typically economically better for wind farm developments. An offsetting or balancing factor is that strong gusts and high turbulence require stronger and more expensive turbines, to reduce the chance of damage and loss of operation. The average power in the wind is not proportional to the average wind speed, however. For this reason, the ideal wind conditions would be strong but consistent winds with low turbulence coming from a single direction.

An important factor in wind-farm design is the spacing between the turbines, both laterally and axially (with respect to the prevailing winds). The closer the turbines are together, the more the upwind turbines block wind from their rear neighbors (the "wake effect"). However, spacing turbines far apart increases the costs of roads and cables and raises the amount of land needed to install a specific capacity of turbines. As a result of these factors, turbine spacing varies by site. In general, wind turbine manufacturers recommend a minimum of 3.5 times the turbine's rotor diameter of clear space between each adjacent turbine's respective spatial envelope. Closer spacing may be possible depending on the turbine model, the conditions at the site, and how the site will be operated. Airflows slow down as they approach an obstacle, known as the "blockage effect", reducing available wind power by approximately 2% for the turbines in front of other turbines.

The design and layout of a wind farm is an important aspect of ensuring the profitability of a wind farm project. However, producing an optimal layout is a non-trivial task. Further, beyond the initial layout or arrangement of a set of wind turbines, it is desirable (and at least theoretically possible) to implement real-time management of a wind farm to maximize the power generated by the set of wind turbines. This would presumably be based on an understanding of the airflow between and around each wind turbine, and the interactions between the airflows.

However, attempts at modeling the complex set of interactions between a set of wind turbines has proven to be very difficult. This is at least partially because of the complexity of the airflows around a turbine, the interactions between those airflows, and the computational resources required to model the situation.

Modeling of structures or components of a structure is often performed as part of a design process to evaluate a proposed design's performance. The structure or component may be a part of a vehicle, a machine, a building, or a consumer product, as examples. The performance being evaluated may relate to wind drag, airflow, efficiency, temperature gradient, pressure gradient, or ease of use, as examples. A goal of using such modeling is to reduce the development time it takes to produce an improved design.

One technique that is used in such modeling is that of computer-aided-engineering (CAE). This technique typically involves the use of a geometric model of a component and the solution of a set of equations (often non-linear differential equations) that describe air flow, energy transport, sound propagation, deformation, fatigue, or another aspect of how the component interacts with its local environment. One such approach uses a computational fluid dynamics (CFD) simulation of an object to evaluate the object's properties when placed into a stream of gas or fluid, where such properties may include drag, lift, pressure drop, or temperature drop over the object, as examples.

While conventional techniques and approaches are very useful and often effective, they have a disadvantage in that they typically involve excessive computational cost and time. This can reduce the desirability of using such techniques to evaluate an object, component, or structure, and as a result improving the design process and producing better performing objects, components, or structures. Further, the computational resources required to utilize a model tend to make it impractical to use for real-time or pseudo real-time control of a system such as a wind farm, thereby preventing optimization of the operation of a wind farm.

Embodiments of the systems and methods described herein are directed to solving these and related problems individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments of the disclosure are directed to systems, apparatuses, and methods for optimizing the design, layout, and operation of a wind farm. In some embodiments, the disclosure is directed to a workflow including one or more of the following processes, functions, operations, components, or elements: (1) a parametrization of geometry, (2) CAE simulation tools, (3) machine learning-based optimizers, (4) a surrogate model trained using a deep learning neutral network (DLNN) (e.g., a Mesh Graph Network, a Graph Convolutional Neural Network, a Geodesic Convolutional Neural Network, a transformer network, or a combination of these, as non-limiting examples (collectively referred to as DLNN)) (5) Surrogate model operation for prediction of CAE or physical data, (6) automated recursive model re-training, (7) mesh manipulation/mesh morphing, and (8) parameter optimization.

In some embodiments, the disclosed system and methods may comprise elements, components, or processes that are configured and operate to provide one or more of the following (as suggested by FIG. 1(*a*) and described further herein with reference to that and other of figures):

- Defining the Geometry of the Shape of a Wind Turbine (WT) Structure;
  - As will be described in further detail, in some embodiments, an existing turbine may be used as a basis for a wind farm, with the existing turbine configuration being subjected to variation in placement within the wind farm and/or optimization with regards to adjustable characteristics of its configuration;
    - Further, in some embodiments, multiple such existing and deployable turbines may be used, subject to variation in placement within the wind farm and/or optimization with regards to adjustable characteristics of its configuration;
- Parameterizing the Geometry (this may be optional and performed if needed);
- Executing a Computational Fluid Dynamics (CFD) or other form of Computer-Aided Engineering (CAE) Model Using the Structure Geometry/Parameters as Inputs;[2]

[2] Such as Finite Element Analysis or Multi-Body Simulation, as non-limiting examples. More specifically, instead of a CFD model, a Finite Element Analysis Simulation for Strength, Distortion, Impact, Forming, Extruding, vibration, Material Properties, or Fatigue, a Finite Element Analysis Electro-Magnetic Simulation, a Finite Element or Finite Volume Acoustic Simulation, a Finite Element or Finite Volume Heat Transfer, a Finite Volume Chemical Simulation, a Mechanical System Multi-Body Simulation technique, or a combination of some or all these simulations may be used.
  - The inputs may also include fixed single or multiple operating point values, such as, but not limited to, air speed, air pressure or air temperature;
- Optimizing the Geometry of the Wind Turbine using the CFD model;
  - In one embodiment, this evaluation is part of an iterative process used to "improve" the Wind Turbine Geometry as well as to generate additional data representing examples of variations in inputs that define the object or structure;
    1. Evaluate CFD Model Outputs by performing calculations related to the performance of the Turbine (such as by generating a value for a performance metric[3] characterizing the Turbine);

[3] As non-limiting examples, such a performance metric may be one or more of drag, lift, force, moment, pressure, pressure drop, temperature, temperature drop, efficiency, resistance, momentum, velocity, acceleration, mass, an inertial characteristic, a thermal characteristic, a flow characteristic, a structural characteristic, a durability or reliability characteristic, a chemical characteristic, an acoustic characteristic, an electromagnetic characteristic, or a characteristic relevant for manufacturing.
    2. Provide as inputs to the Optimizer the Turbine's performance and the Turbine geometry (in the form of parameters, for example);
    3. Operate the Optimizer to generate a new geometry (in the form of revised Turbine parameters, for example);
    4. Input the new geometry into the CFD model and execute CFD model;
    5. Evaluate CFD Model Outputs by performing calculations related to the performance of the Turbine (such as by generating a value for a performance metric characterizing the Turbine);

Repeat the preceding steps 2 through 5 multiple times, until the optimization process reaches the goal or is otherwise complete (or reaches an acceptable state);
- In some embodiments, the optimization process may use Bayesian, gradient based or a genetic algorithm (or a combination);
- Typically, a goal of the optimization is to produce a set of outputs that represent a desired (or improved) performance as indicated by one or more measures or metrics (such as drag, lift, downward force, pressure drop, temperature, mass, or ease of operation, as non-limiting examples);
- In some embodiments, the CFD (or other CAE model) runs generate training data for a variety of input flow fields and turbine torques and blade pitch angles. However, the turbine design is not changed. Once a satisfactory turbine model is obtained, it can be deployed across a number of different wind farms and arrangements;
- In some embodiments, the CFD (or other CAE model) runs may be used to generate training data for a variety of input flow fields and turbine torques and blade pitch angles;
- However, in some cases, a turbine or turbines may already be in production and optimization is not possible or desirable;
  - Instead, in such cases, one or more different turbine configurations may be selected, for example, different existing blade shapes and lengths may be selected from a number of options and used as a source of input data for a CFD model;
    - As a non-limiting example, in the case where one or more turbines are already in production and the turbine(s) were not subject to an optimization process, the disclosed approach can be implemented by generating training data by one or both of (a) changing configurations and running those inputs through CFD under the control of a human, or in a prescribed order and/or (b) using an optimizer to change configurations and running that through CFD tinder the control of an optimizer;
      - The optimized turbine or turbines may then be used to form an ensemble (as described in greater detail herein);
  - In another example, one or more other parameters or aspects of turbine configuration may be selected and used as a source of input data. These parameters or aspects of turbine configuration may include (as non-limiting examples):

- Different cooling configurations may be selected from a number of options;
- Different gearbox designs;
- Different generator designs;
- Pitch and yaw hydraulics designs; or
- Turbine tower heights;

Whether based on an optimized single turbine design or a set of deployable turbines with more than a single configuration, the CFD Model outputs for each turbine configuration are used as a source of training data for a DLNN for that turbine;

Convert the CFD Model Outputs to an appropriate Format for Use as an Input to a Deep Learning Neural Network (DLNN);

The conversion may be applied to all, or to a subset of the geometries and CFD outputs generated/produced during the optimization process;

Non-limiting examples of a DLNN include a Mesh Graph Network, a Graph Convolutional Neural network (GCNN)[4], a Geodesic Convolutional Neural Network, a Transformer Neural Network (or a combination of these), or a similar type or form of Neural Network;

[4] In a GCNN, each layer is composed of 1) a convolutional block that produces two separate convolutional outputs, and 2) a gating block that uses one convolutional output to gate the other.

The conversion process may involve a transformation, vectorization, or expression as a tensor, as non-limiting examples;

The trained DLNN model will function as a "surrogate" representation of the CFD model;

Use the Data (such as Geometry and at times Operating Points) from the Optimizations of the CFD Model Outputs as Training Data for the DLNN Model;

The training data may include one or more of scalar, mesh, and field data for the Turbine geometry, and operating conditions (e.g., external pressure, temperature, or total flow as non-limiting examples);

In the situation in which one or more turbines have been manufactured and multiple turbine configurations and/or site placements used as inputs to a CFD model, the outputs for each turbine configuration may be used as training data for the DLNN model for that turbine;

In one embodiment, the input(s) to a surrogate model may include one or more of:

V(x,y,z) or V(x,y) and P(x,y,z) or P(x,y), where V represents the upstream velocity field and P the upstream pressure field;

The upstream velocity vector field V(x,y,z) and pressure field P(x,y,z) in a chosen volume placed just ahead of the wind turbine may be used, or alternatively the "volume" may be a slice, i.e., a window with V(x,y) and P(x,y) placed just ahead of the wind turbine (where V is a vector and P is a scalar); Turbine yaw angle;

Turbine blade pitch angle;

Turbine motor torque;

Air temperature and density;

Depending upon terrain, terrain geometry and turbine height may be used;

In one embodiment, the outputs(s) of the surrogate model include one or more of:

The downstream "wake" created by the operation of the turbine as expressed by the downstream velocity and pressure fields (V(x,y,z) or V(x,y) and P(x,y,z) or P(x,y)) in the $i^{th}$ window behind (downstream of) the wind turbine (as suggested by the illustration of FIGS. 6 and/or 7); and Turbine speed (as a result of the input velocity field from the inputs);

Note that in some embodiments, the vector field components Vi(x,y) from one or more (typically all) upstream turbines may be summed to form the input V(x,y) for a downstream turbine. To a first approximation, these Vi(x,y) can be summed by superposition, thereby neglecting non-linear interactions between airflows or airflow components from multiple contributing turbines, or may be summed by more complex interaction models which a user can define (as suggested by the illustration of FIGS. 6 and/or 7);

Such second order interaction models can be simulated by placing several turbines in series, with offsets, and observing the difference in results with a full CFD interaction model. In conditions where the second order interaction is not small or believed to be significant, a training data set may include multiple turbines, rather than only one;

Use a Recursive Process Under Control of Agent (such as an Optimizer) to Improve the performance of the DLNN Model;

The Agent may execute one or multiple recursive re-training loops if the DLNN is not of sufficient quality, for example if the uncertainty of the model is too high. The agent may then trigger additional CFD evaluation cycles (i.e., iterations) and re-train the DLNN model using that data;

If Desired, Continue Training of the DLNN Model Using CFD Model Data or Other Data (e.g., experimental data), while tuning the DLNN Model Hyperparameters.

After the DLNN Model is trained, it may be used to assist in the design of the Turbine in place of the CFD/CAE simulation (and be considered a "surrogate" of the CAE simulation), by performing the following steps, stages, operations, functions, or processes:

Obtain the Optimized Object or Structure Input Geometry from the CFD Model Optimization Process (this may be the best performing, one of the best performing, or another of the optimized objects or structures);

Input the object's or structure's optimal geometry, mesh data, or parameters found from the preceding step or stage into the trained DLNN model as a baseline set of parameters for further optimization;

Perform Optimization of the Turbine Data Using the Trained DLNN Model;

This optimization is similar to that used as part of the CFD model optimization but uses the DLNN Surrogate instead of the CFD model to evaluate the performance of new sets of object or structure input parameters;

This distinguishes embodiments of the disclosure from conventional approaches. Applying the optimization process flow to the DLNN "Surrogate" model, which has been pre-trained and adapted to process input data more efficiently in the form being used (as indicated by a data representation layer formed in the DLNN), results in a more computationally efficient (and in many cases, more accurate) model;

A further difference between the disclosed approach and conventional approaches is that the disclosed approach incorporates training on previously optimized geometries, turbine configurations, or turbine placements combined with automated recursive loops based on predicting the Surrogate's uncertainty. Further, the overall process flow of some embodiments combines operations using both parametrization and morphing (for example by distorting finite element or finite volume meshes) to generate new geometries during the optimization process using CFD, or during the optimization process using a DLNN;

In some embodiments, the surrogate is trained on both CFD inputs and outputs. For example, one CFD input is the geometry/shape of a structure, which is used to train the surrogate. A CFD output may be a flow field, which the surrogate is also trained on to predict that flow field based on the changing geometry during the optimization process;

Depending Upon Application, Introduce Output of Trained Surrogate Model into Other Process or Model;

In some embodiments, an output of the disclosed geometry optimization using the Surrogate is a description of a structure optimized for a specific application, operating environment, a set of operating points, or use case;

The output typically includes the conversion and export of the optimum structure geometry or parameters in a file format that the next stage of an overall process can utilize (such as a 3D-CAD file), which may then be used as part of designing and/or manufacturing the object or structure. As an example, the output of the preceding processing flow may include the optimized parameters, an optimized 3-dimensional geometry/structure, and in some cases, other relevant metrics (such as predicted performance parameters). The optimum structure determined by the Surrogate can also be used as a starting point or sub-model for other models, simulations, or process flows.

After a Surrogate Deep Learning Neural Network (DLNN/DL) Model for a single wind turbine is trained (and the design or configuration of a single wind turbine (or a set of deployable turbines) has been optimized), it may be used to assist in the design of a wind farm (WF) by performing the following steps, stages, operations, functions, or processes (as suggested by FIG. 1(*b*) and described further herein with reference to that and other of the figures):

Model the wind farm as a set of N optimized single wind turbine surrogate models generated from the preceding process flow;

as disclosed and/or described herein, in some embodiments, the N optimized single wind turbine surrogate models may be replaced (in whole or in part) by one or more deployable wind turbines and their associated configurations (in which case, the N turbines may be represented by a number of turbines of each of a plurality of configurations, where each configuration may include a blade design, a tower height, or a cooling system, as non-limiting examples);

Arrange the set of N single wind turbine surrogate models in a layout or siting configuration (which may be varied as part of the overall optimization process), where the configuration may include:

a location, separation, and orientation of each wind turbine;

site or landscape features or contours (which may impact the height or orientation of one or more of the turbines);

a set of (initial) specifications for each of the N wind turbines (e.g., power, pitch, yaw, height, or blade shape, as non-limiting examples);

Form an ensemble of the optimized single wind turbine surrogate model into one single wind farm surrogate based on the defined arrangement of the set of N wind turbines;

using the wind farm surrogate model, generate a prediction of the total power output of the wind farm based on the wind farm configuration of N turbines and the individual wind turbine configurations;

as also disclosed, instead of a set of (typically identical) single wind turbine surrogate models, the wind farm surrogate model may be formed from a set of deployable turbines, with possible variations in turbine configurations;

Optimize the wind farm layout by iteratively changing the layout and/or the wind turbine configurations, until an optimal total wind farm power output has been achieved;

the optimal configuration may be achieved by using ML optimizers in an iterative loop, and the optimal solution may include consideration of constraints, such as acoustic noise, construction or operating cost, or structural limitations, one or more of which can be predicted in a subsequent calculation by an additional DLNN;

a result of the optimization process for the wind farm surrogate will be a "best" layout and desired configuration for each of the N turbines in the wind farm, including the power produced under various environmental conditions (such as wind speed profile at the wind farm site, air temperature, or air density, as examples);

as suggested, in some embodiments or use cases, the goal of an optimization may include a value to maximize, a value to minimize, or a constraint or limitation on a characteristic of a wind turbine, a set of wind turbines, or the wind farm as a whole;

The optimized wind farm layout and turbine configurations as represented by the surrogate may be used as part of a control system for a wind farm by varying the real-time pitch and yaw angles of individual wind turbines to optimize the wind farm power output, with the optional ability to perform the optimization subject to reducing the noise generated by the wind farm and/or the stress on the turbine components (as non-limiting examples, or in consideration of other factors);

this may depend on the materials or construction methods used, and may be measured by appropriately placed sensors;

this may take into consideration the environmental conditions (wind speed profile at the wind farm site, air temperature, or air density, as non-limiting examples);

one may also (or instead) construct such a surrogate for an already existing wind farm, using simulations of the existing wind farm to train the surrogate, and then deploy this surrogate as part of a control system, without a configuration or turbine location optimization loop required. This represents a relatively inexpensive retrofit to an existing site, to create a higher power output via real-time control.

As described, instead of using an optimized design for a turbine (which may include one or more parameters or variables that may be adjusted in a subsequent optimization), the disclosed approach may also be used with a set of existing turbines that are to be arranged into a wind farm. The set of turbines may include a set of available configurations (i.e., with varying mast height, blade type, or cooler size, and with some having adjustable characteristics), and in that case it is desirable to determine an optimized layout or siting arrangement for a wind farm using one or more these available deployable turbines and associated configurations.

In such a use case, the disclosed approach operates to determine a position and turbine configuration (from the available ones, which as mentioned, may vary in certain characteristics) for a set of turbines to form a wind farm that has been optimized based on a goal or objective (and may be subject to one or more constraints). Thus, in the situation of manufactured and deployable turbines, embodiments operate to determine a wind farm layout using one or more of the available turbine configurations, instead of optimizing the design of a single turbine.

In one embodiment, the disclosure is directed to a system for optimizing the geometry or parameters of a structure or object in situations in which the structure, component, element, or object is placed into (and in some cases, operated in) a fluid or gas flow, subject to static or transient forces, exposed to acoustic sound waves, electro-magnetic fields, or thermal fields, or impacted or affected by other physical forces or environments.

Further, embodiments of the disclosure are directed to a system and methods for optimizing the arrangement and/or operational conditions of an ensemble of such optimized (or available) structures to maximize a performance metric or implement a constraint. As a non-limiting example, for a wind farm comprised of an ensemble of wind turbines, the operational condition may be that of maximizing output of the wind farm subject to a specified set of environmental conditions at a wind farm site and a set of wind turbine configurations or specifications. Further, as disclosed, instead of determining an optimized configuration or design for a wind turbine, embodiments may determine an optimal layout of a set of deployable turbines, where the set of turbines includes one or more turbine configurations (i.e., specifications or designs).

In one embodiment, the system may include a set of computer-executable instructions, a memory or data storage element containing the set of instructions (such as one or more non-transitory computer-readable media), and one or more electronic processors or co-processors. When executed by the processors or co-processors, the instructions cause the processors or co-processors (or a device or apparatus of which they are part) to perform a set of operations that implement an embodiment of the disclosed method or methods.

In one embodiment, the disclosure is directed to one or more non-transitory computer-readable media including a set of computer-executable instructions, wherein when the set of instructions are executed by one or more electronic processors or co-processors, the processors or co-processors (or a device or apparatus of which they are part) perform a set of operations that implement an embodiment of the disclosed method or methods.

In some embodiments, the systems and methods disclosed herein may provide services through a SaaS or multi-tenant platform. The platform provides access to multiple entities, each with a separate account and associated data storage. Each account may correspond to a user, a set or category of users, an entity, a set or category of entities, a set or category of data, a specific wind farm or location, an industry, or an organization, for example. Each account may access one or more services, a set of which are instantiated in their account, and which implement one or more of the methods or functions disclosed herein.

Other objects and advantages of the systems, apparatuses, and methods disclosed will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in detail herein. However, the embodiments are not intended to be limited to the exemplary or specific forms described. Rather, the disclosure covers all modifications, equivalents, and alternatives falling within the scope of the appended claims.

BRIEF DESCRIPTION OF THE DRAWINGS

Embodiments of the disclosure are described with reference to the drawings, in which:

FIG. 1(*b*) is a flowchart or flow diagram illustrating a method, process, set of operations, or set of functions for using an ensemble of (a) the optimized geometry or parameters for a single wind turbine or (b) a set of manufactured and deployable turbines, some having different configurations, to represent a wind farm and to optimize the performance of the wind farm by determining a desirable siting or placement of each turbine, in accordance with some embodiments;

FIGS. 1(*c*) through 1(*i*) are a set of flowcharts or flow diagrams illustrating details of one or more of the processing steps or stages illustrated in FIGS. 1(*a*) and 1(*b*);

FIG. 6 is a diagram illustrating the downstream "wake" created by the operation of a turbine as expressed by the downstream velocity and pressure fields (V(x,y,z) or V(x,y) and P(x,y,z) or P(x,y)) in the $i^{th}$ window behind (downstream of) the wind turbine.

Note that the same numbers are used throughout the disclosure and figures to reference like components and features.

DETAILED DESCRIPTION

Figure 1A:
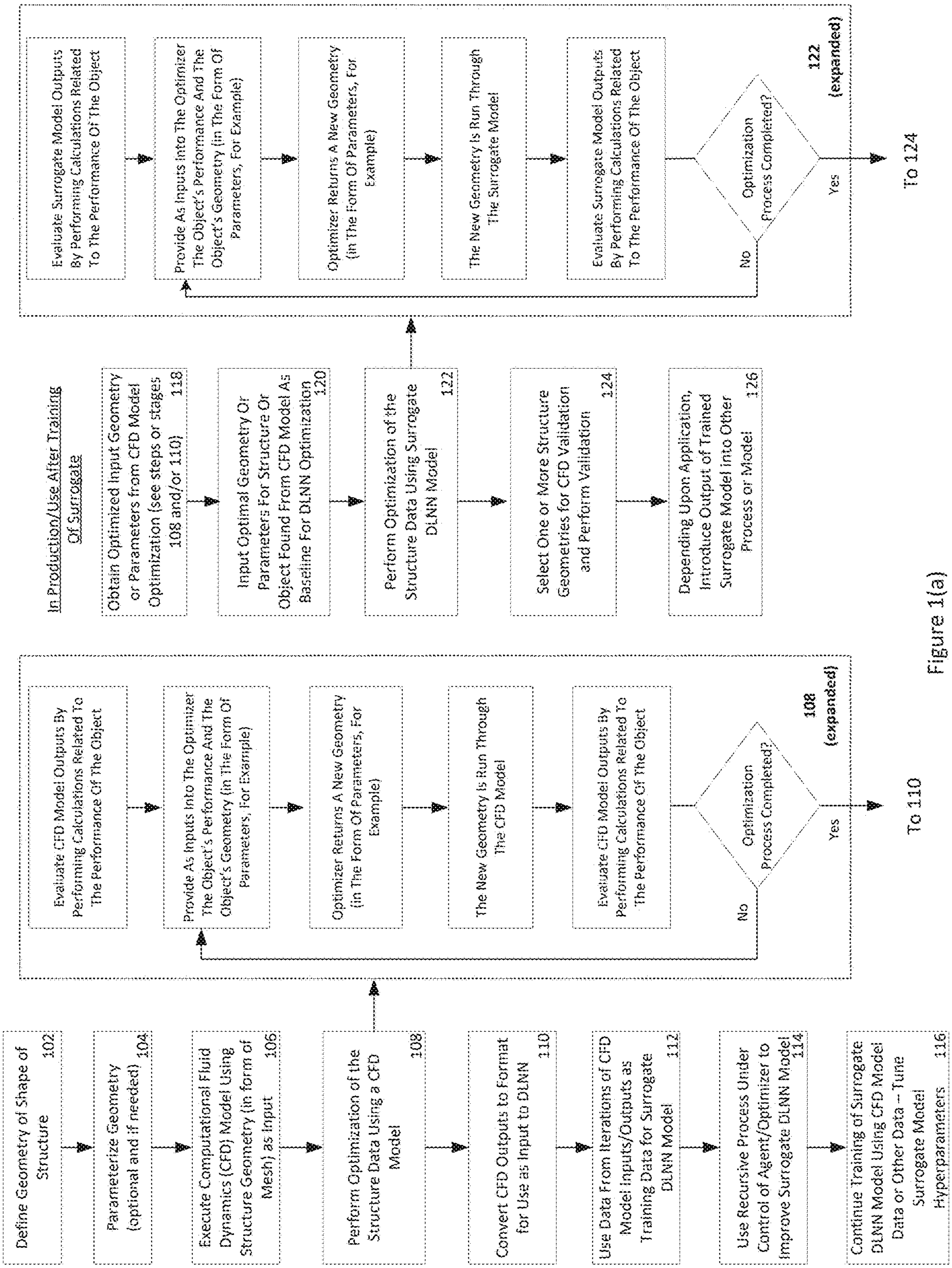
FIG. 1(*a*) is a flowchart or flow diagram illustrating a method, process, set of operations, or set of functions for optimizing the geometry or parameters of a structure or object, in accordance with some embodiments.
Figure 1B:
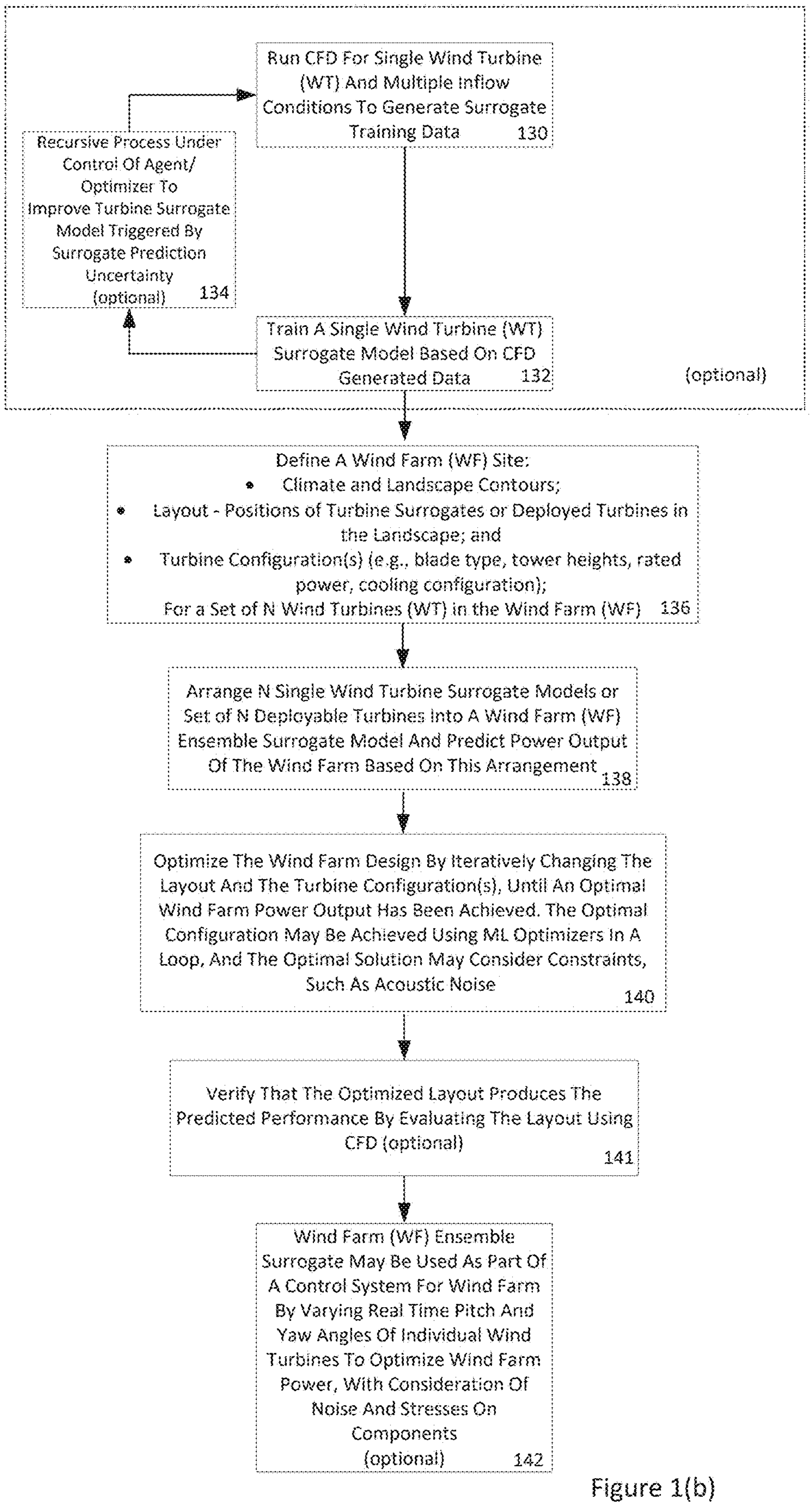
Figure 1C:
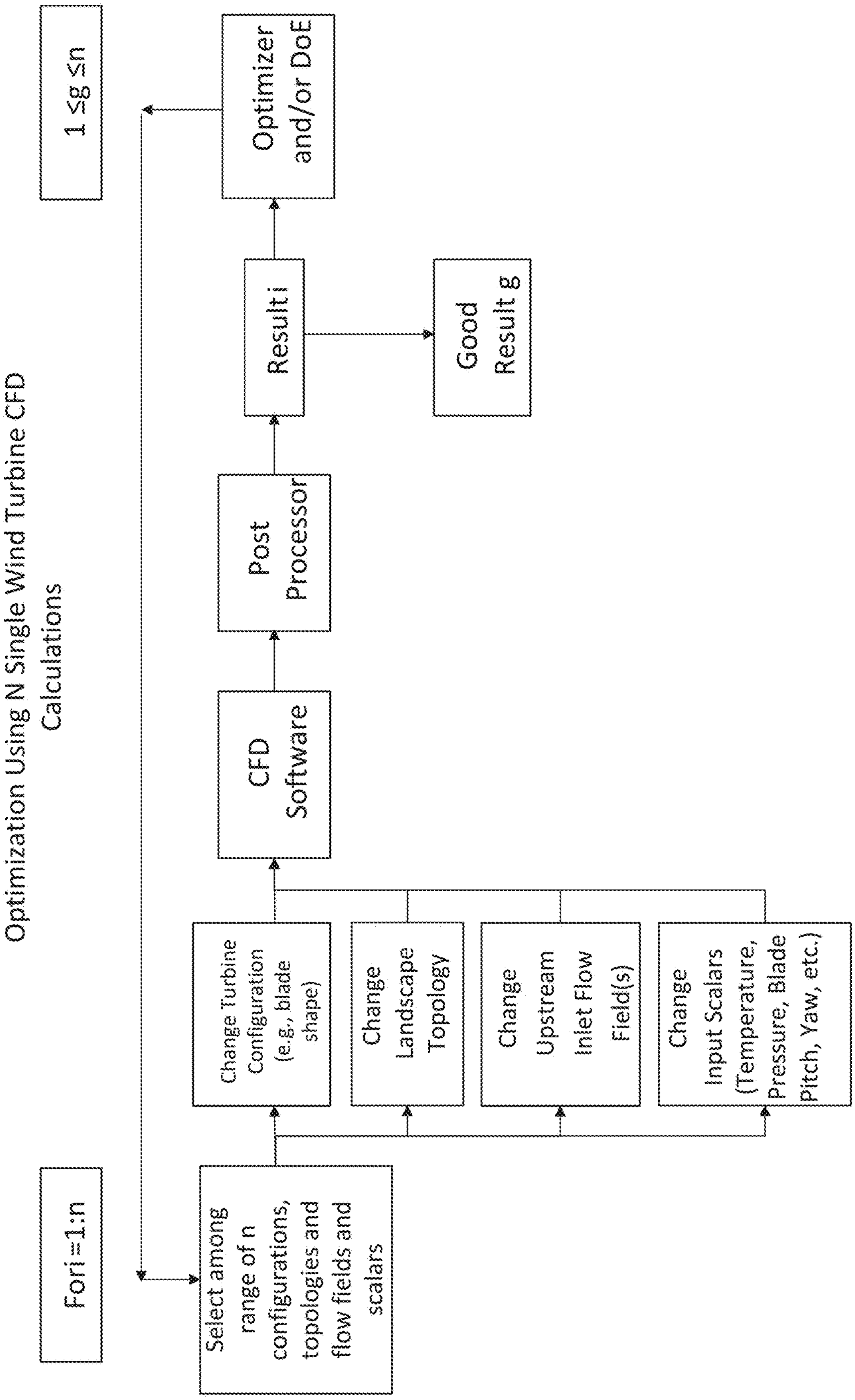
Figure 1D:
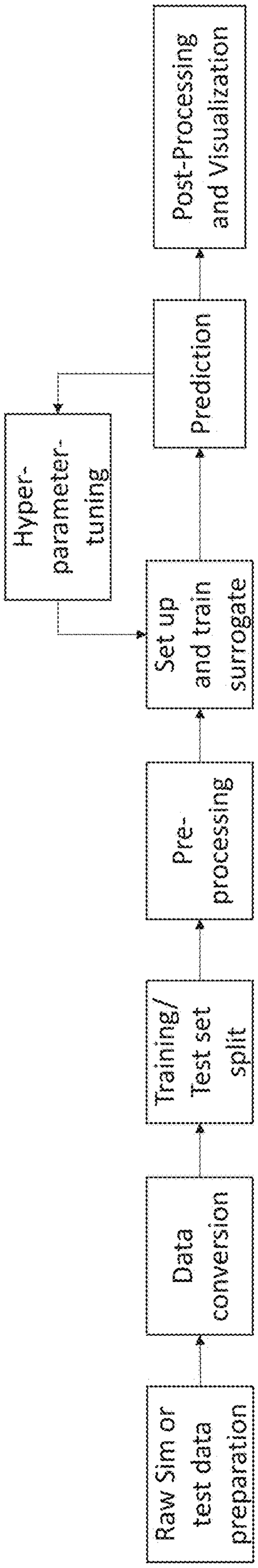
Figure 1E:
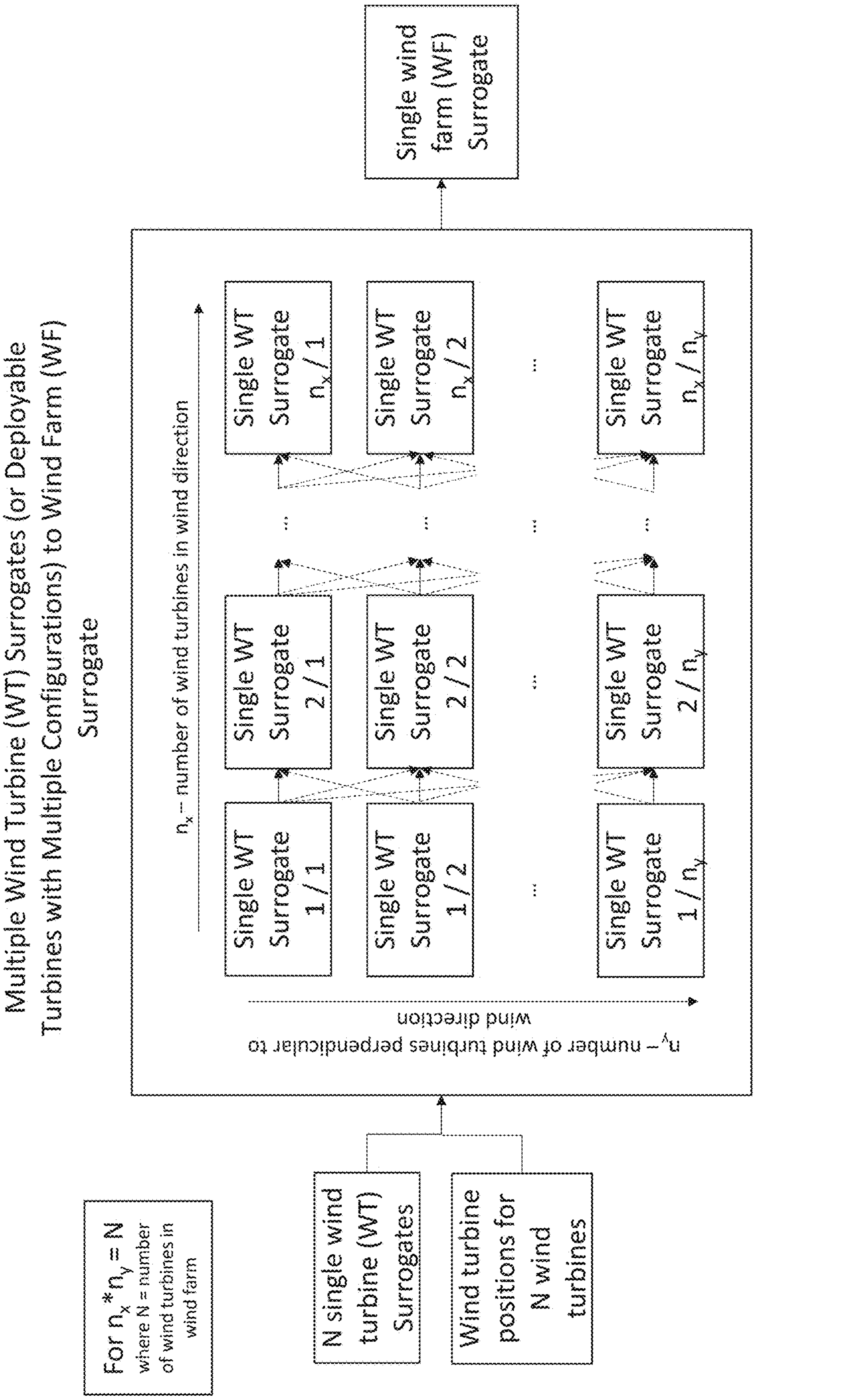
Figure 1F:
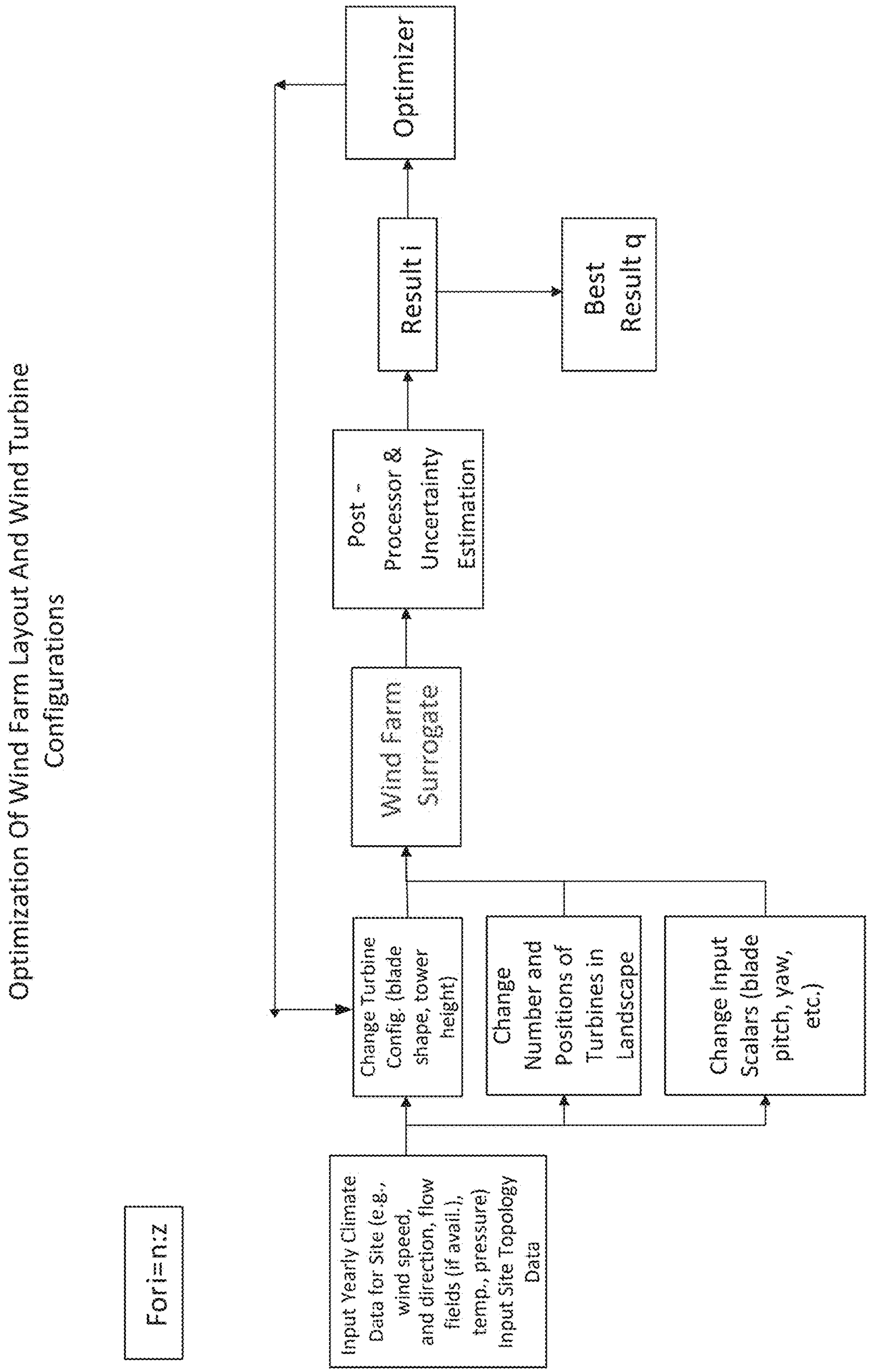
Figure 1G:
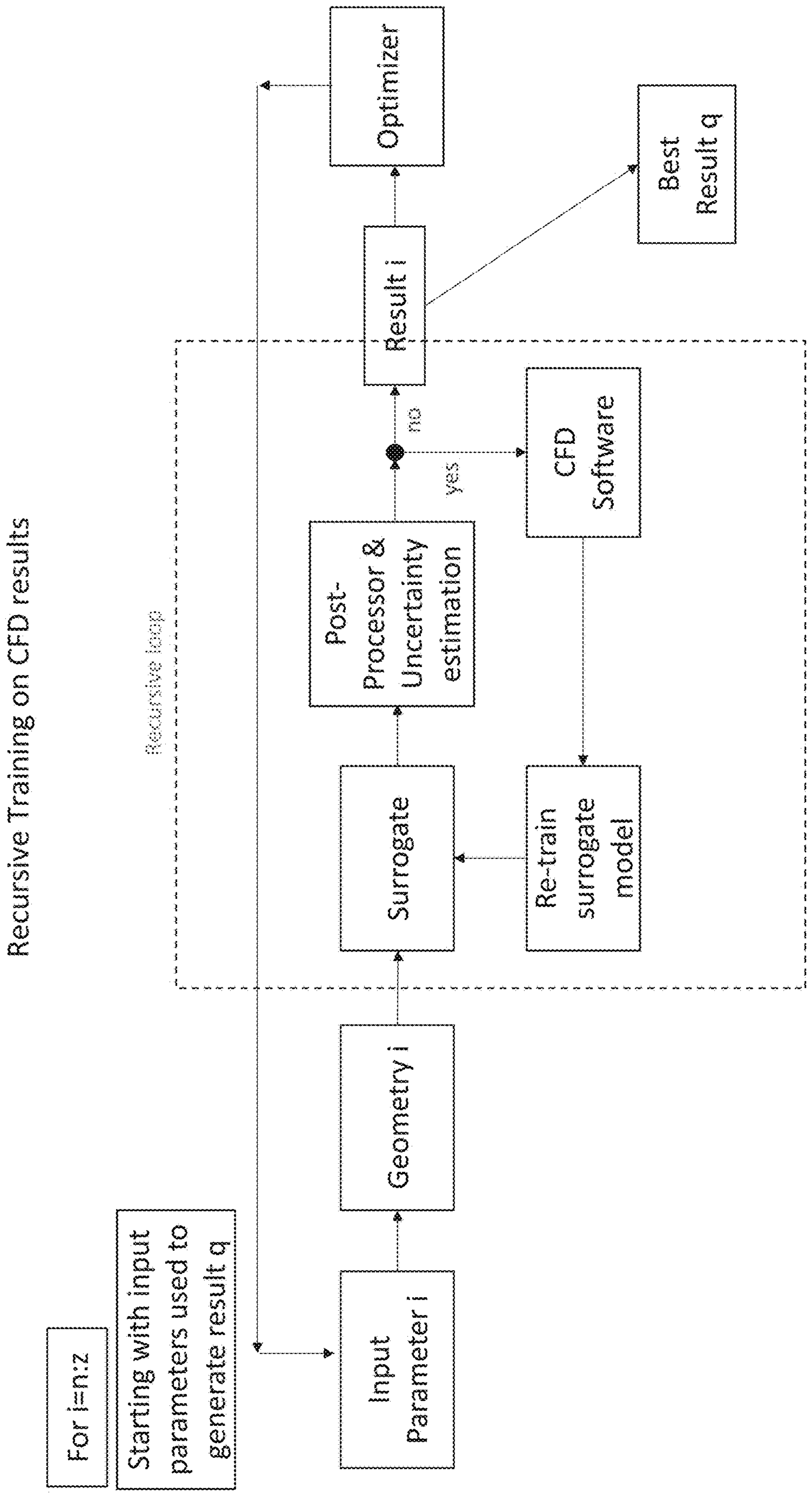
Figure 1H:
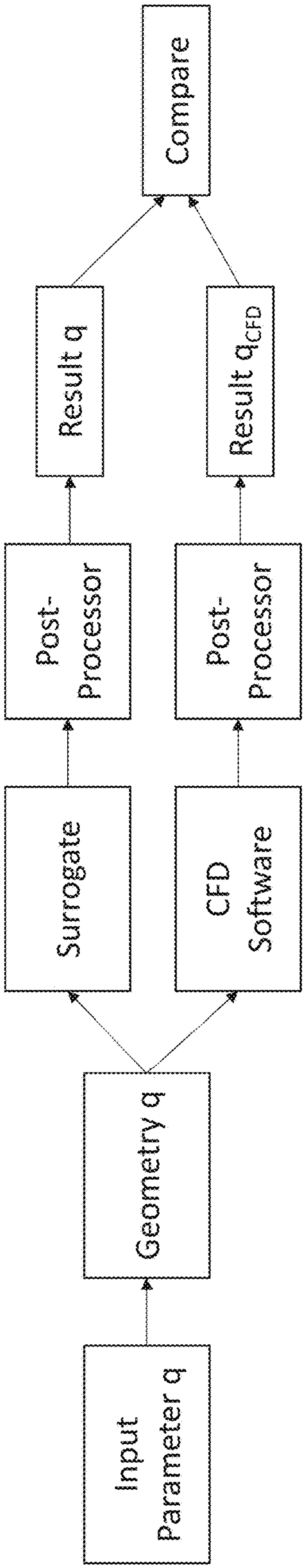
Figure 1I:
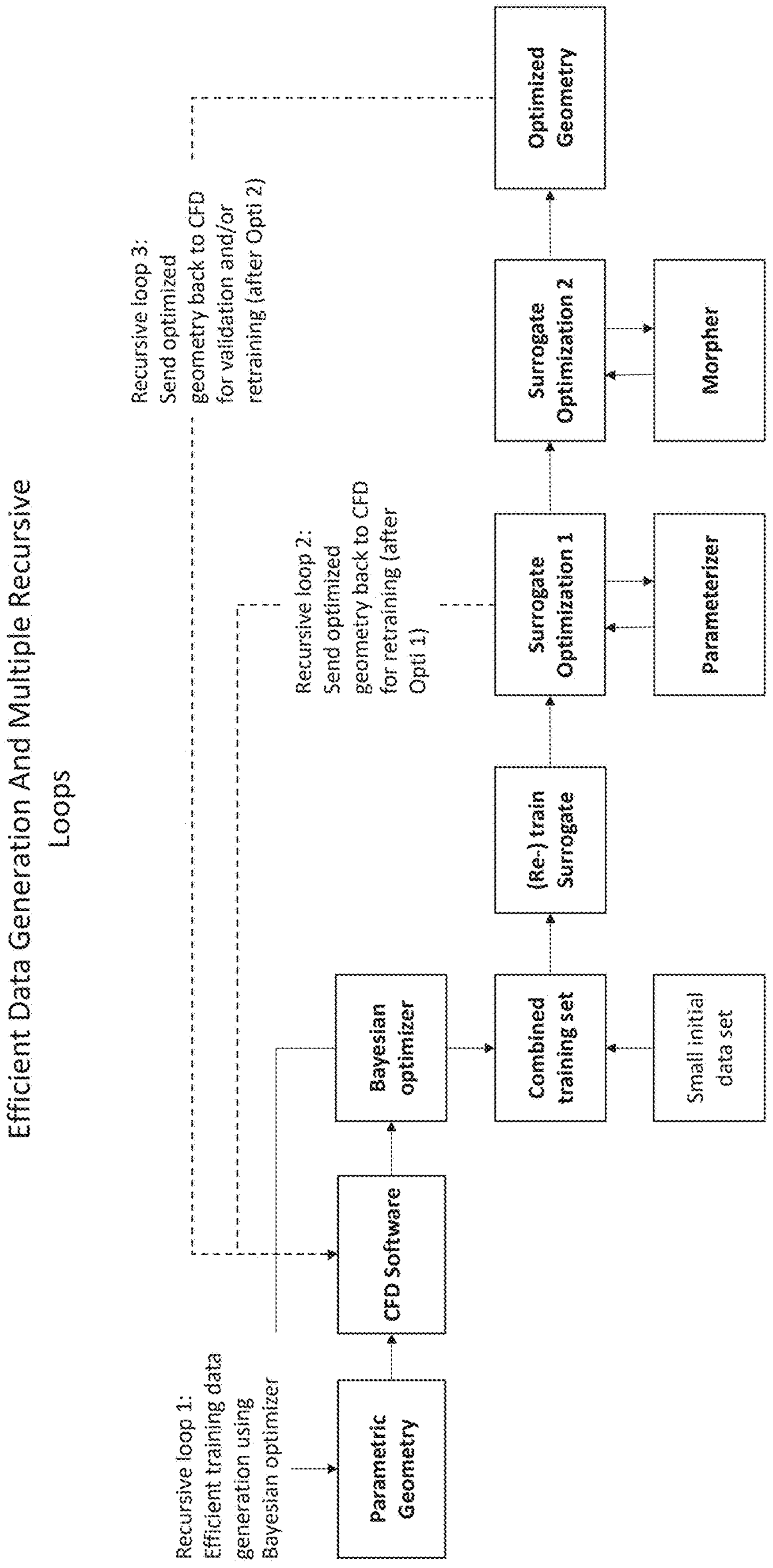

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter will be described more fully herein with reference to the accompanying drawings, which show by way of illustration, example embodiments by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods disclosed and/or described herein may be implemented by a suitable processing element or elements (such as a processor, microprocessor, co-processor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory computer-readable media or data storage elements. In some embodiments, the set of instructions may be conveyed to a user over a network (e.g., the Internet) through a transfer of instructions or an application that executes a set of instructions.

In some embodiments, the systems and methods disclosed and/or described herein may provide services to end users through a SaaS or multi-tenant platform. The platform provides access to multiple entities, each with a separate account and associated data storage. Each account may correspond to a user, a set of users, an entity, a set or category of entities, a set or category of users, a set or category of data, a specific wind farm or location, an industry, or an organization, for example. Each account may access one or more services (such as applications or functionality), a set of which are instantiated in their account, and which implement one or more of the methods, process, operations, or functions disclosed and/or described herein.

In some embodiments, one or more of the operations, functions, processes, or methods disclosed herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

As used herein, the term "surrogate" in the context of identifying a model refers to a data-driven or empirical model, such as a machine learning model (for example, a Deep Learning Neural Network model) used in place of a CAE simulation (for example, a CFD simulation, or an FEA simulation). The surrogate model, when presented with the same inputs as the CAE simulation, can reproduce (at least approximately) the outputs of the CAE simulation using the same or very similar inputs, while being significantly faster in a computational sense. The surrogate is therefore able to replace the CAE simulation tool in some engineering processes, for purposes such as enabling a significantly faster optimization of a design, as a non-limiting example. When trained with both CAE data and experimental data, simultaneously or sequentially (or in a proportion thereof), the surrogate may also be more accurate than the CAE simulation, and typically faster than the CAE simulation.

As used herein, the term "optimizer" is used in the context of optimizing a set of parameters within a fixed parameter space to arrive at an optimum or close to optimum combination of parameters which generate the "best" performance of an object or set of objects. By defining one or multiple optimization goals or objectives (for example, to maximize electrical power output, to minimize turbulence, to minimize noise generated, or to minimize structural stress, as non-limiting examples) and/or optimization constraints (for example, limiting the size of a wind turbine or number of wind turbines in a wind farm), a user can exert control over the optimization process.

The objectives and/or constraints may be combined into a single "cost" function with adjustable weights. An optimization algorithm will try to maximize or minimize the cost function. Examples of suitable optimization algorithms are genetic algorithms (inspired by natural selection and using operators such as mutation, crossover, and selection), gradient-descent based algorithms (an iterative approach based on differentiation), and Bayesian optimizers (based on a gaussian process). These algorithms can "learn" from previous optimizations steps based on the different methodologies and are able to suggest a subsequent set of optimized parameter combinations for evaluation.

Embodiments of the disclosure relate to a method, an engineering workflow, and a system for optimization of a wind farm layout. To optimize the average power output (AP) of a wind farm, factors such as the year-round wind speed profile, air temperature and density, as well as the terrain and operational constraints may need to be considered. Such constraints may include blade loading, fatigue and temperature of turbine components, and acoustic limitations required to meet local noise abatement or similar regulations.

Such wide-ranging requirements are ill-suited to use of traditional computational methods. For example, to study the wake loss effects in large wind farm arrays subjected to terrain undulations, no suitable CFD method can cover the computational domain of several cubic kilometers down to resolving tip vortices at the millimeter scale, as this would require a mesh covering a $10^{18}$ computational range and solutions with time-dependent flows (such as Large/Detached Eddy Simulations). With highly adaptive meshes and sophisticated solver adaptation, a singular solution may be possible, but a system-wide optimization considering the various parameters is not practical. As a result, high-fidelity CFD methods have been approximated by forcing functions, chaotic polynomial expansions, and similar techniques, none of which are accurate enough compared to the ground truth and in-field data.

FIG. 1(*a*) is a flowchart or flow diagram illustrating a method, process, set of operations, or set of functions for optimizing the geometry or parameters of a structure, component, element, or object in situations in which the structure, component, element, or object is placed into (and in some cases, operated in) a fluid or gas flow, subject to static or transient forces, exposed to acoustic sound waves, electro-magnetic fields, or thermal fields, or impacted or affected by other physical forces or environments. In some embodiments, the illustrated method, process, set of operations, or set of functions may be performed by executing a set of computer-executable instructions, some (or all) of which may be executed in a client device and/or in a remote server platform.

As disclosed, in some embodiments, optimization of the geometry or parameters of a structure or object (in one example, a wind turbine) may be performed by implementing the following steps or stages:

- Defining the Geometry of the Shape of an Object or Structure (as suggested by step or stage 102);
  - This may comprise a set of geometrical or other shapes, relative measurements, or other indications of the configuration and elements of an object or structure;
    - for a wind turbine, this configuration or set of specifications may include turbine height, power output, pitch and yaw, component shape information such as for blade, nacelle or tower (each of which may be represented parametrically or in the form of a mesh), as well as site specific information, such as landscape and environmental conditions (wind direction and speed, or humidity, as examples) which may be represented geometrically in the form of a mesh;
- Parameterizing the Geometry (optional and if needed) (as suggested by step or stage 104);
  - This may comprise transforming or converting the geometric shapes and/or measurements into one or more parameters used to "define" the object or structure;
    - such parameters may be (but are not limited to) distances, radii, number of features or parameters in latent space defined through dimensional reduction techniques, such as autoencoders or Principal Component Analysis (PCA);
- Executing a Computational Fluid Dynamics (CFD) Model Using the Structure Geometry/Parameters as Inputs (as suggested by step or stage 106);
  - Typically, the CFD model will use finite-element/volume techniques to form a "mesh" or grid over the structure or object and then solve a set of non-linear differential equations to generate a "prediction" of the fluid flow over and around the structure or object, and the resulting thermal, pressure, velocity, or other characteristic(s) of interest;
- Perform Optimization of the Structure or Object Data Using a CFD Model (as suggested by step or stage 108 and the steps or stages in the box labeled "108 (expanded)");
  - In general, this involves the following set of steps or stages:
  1. Evaluate CFD Model Outputs by performing calculations related to the performance of the object as defined by the data (such as by generating a value for a performance metric characterizing the object or structure);
     - for the example of a wind turbine, such performance metrics may include the turbine power, the air drag of the blades, the turbulence created by the turbine or in the overall flow field, air velocity into and leaving a turbine, turbine temperature, or derating (the reduction of power due to turbine limitations), as non-limiting examples;
  2. Provide as inputs to the Optimizer the Object's performance and the Object's geometry (in the form of parameters, for example);
  3. Operate the Optimizer to generate a new geometry (in the form of object or structure parameters, for example);
  4. Input the new geometry into the CFD model and execute CFD model;
  5. Evaluate CFD Model Outputs by performing calculations related to the performance of the Object (such as by generating a value for a performance metric characterizing the object or structure);
  6. Repeat the preceding steps 2 through 5 multiple times, until the optimization process reaches the goal or is otherwise complete (or reaches an acceptable state);
  - In some embodiments, the optimization process may use a Bayesian, gradient based, or a genetic algorithm (or a combination);
    - in general, this involves modifying one or more of the CFD model inputs (such as a structure or object's geometry and in some cases a CFD boundary condition or operating points, such as air velocity or air temperature) to generate a new set of outputs, evaluating the outputs using some form of performance metric or comparison, and then executing the CFD model with a new set of inputs;
    - this process is continued until either a defined number of CFD runs are reached, or an indication is presented that significant improvements are unlikely to be obtained by further optimization cycles;
- Convert the CFD Model Outputs into an Appropriate Format for Use as an Input to a Deep Learning Neural Network (DLNN) (as suggested by step or stage 110);
  - This may involve the conversion of a universal or solver specific CAE file exchange format (e.g., CGNS, or VTK) into a file input format natively supported by the neural network (e.g., H5). This may also include restructuring and neglect of data in the CAE/CFD file which is not needed for neural network training;
    - the conversion may be applied to all, or to a subset of the geometries and CFD outputs generated/produced during the optimization process;
- Use Data from Iterations of the CFD Model Inputs/Outputs as Training Data for a "Surrogate" DLNN Model (as suggested by step or stage 112);
  - The training data may include one or more of scalar, mesh data, and field data for the object or structure geometry and may include relevant operating conditions (external pressure, temperature, or total flow, as non-limiting examples);
    - relevant data and operating points are the ones especially close to the later predicted quantities and operating points (i.e., if the model is supposed to predict well on unseen temperatures, it should be trained on multiple different temperatures during training, so it learns the relationships with respect to temperature to increase its prediction accuracy);

Use a Recursive Process Under Control of an Agent (such as an Optimizer) to Improve the Performance of the Surrogate DLNN Model (as suggested by step or stage 114);

The Agent may execute one or multiple recursive "re-training" loops if prediction uncertainty limits are exceeded or are otherwise undesirable after performing an iteration. The agent will then trigger additional CFD evaluation (iterations) and re-train the surrogate using that data; and If Desired, Continue Training of the Surrogate DLNN Model Using CFD Model Data or Other Data (e.g., experimental data), while tuning the DLNN Model Hyperparameters (as suggested by step or stage 116).

After the Surrogate DLNN Model is trained, it may be used to assist in the design of the structure or object by performing the following steps, stages, operations, functions, or processes:

Obtain the Optimized Object or Structure Input Geometry from the CFD Model Optimization Process (i.e., from steps or stages 108 and/or 110, and as suggested by step or stage 118);

Input the optimal geometry, mesh data, or parameters for the object or structure found from the preceding step into the trained DLNN as a baseline set of parameters for further optimization (as suggested by step or stage 120);

Perform Optimization of the Object or Structure Geometry using the DLNN Surrogate (as suggested by step or stage 122 and the steps or stages in the box labeled "122 (expanded)");

In some embodiments, the surrogate is trained on both CFD inputs and outputs. For example, one CFD input is the geometry/shape of a structure, which is used to train the surrogate. A CFD output may be a flow field, which the surrogate is also trained on to predict that flow field based on the changing structure geometry during the optimization process;

This optimization is similar to that used as part of the CFD model optimization but using the DLNN surrogate instead of the CFD model to evaluate the performance of new sets of object or structure input geometry and/or parameters;

1. Evaluate Surrogate Model Outputs by performing calculations related to the performance of the Object; for the example of a wind turbine, such performance metrics may include power, drag, turbulence, or air velocity into and leaving a turbine, as non-limiting examples;
2. Provide as inputs into the Optimizer the Object's performance and the Object's geometry (in the form of parameters, for example);
3. Operate the Optimizer to generate a new geometry (in the form of parameters, for example);
4. Input the new geometry into the Surrogate and execute the Surrogate;
5. Evaluate Surrogate Model Outputs by performing calculations related to the performance of the Object; and
6. Repeat the preceding steps 2 through 5 multiple times, until the optimization is complete (or reaches an acceptable state);

Select One or More Final Geometries Which Indicate the Highest Performance as Predicted by the Surrogate Model (as suggested by step or stage 124);

The highest performance may be determined by a weighted cost function, a tradeoff between multiple performance metrics such as heat exchange, weight or volume, or a method of determination via another algorithm or application of engineering judgement;

Evaluate these Final Geometries with CFD to Validate their Performance;

A validation step assures that the optimization using the Surrogate created a geometry which generates performance that is corroborated by the CAE model (as suggested by step or stage 124 and as shown in FIG. 1(*b*));

Depending Upon the Application, Introduce the Output of the Trained Surrogate Model into Another Process or Model (as suggested by step or stage 126);

An output of the optimization using the Surrogate is a description of a structure (such as a geometry) optimized for a specific application or use (such as for a specific environment or operating conditions);

the output typically includes the conversion and export of the optimum structure geometry or parameters in a file format that the next stage of an overall process can utilize (such as a 3D-CAD file), which may then be used as part of designing and/or manufacturing the object or structure. As an example, the output of the preceding processing flow may include the optimized parameters, an optimized 3-dimensional geometry/structure, and in some cases, other relevant metrics (such as predicted operational parameters);

the optimum structure determined by the "surrogate" can also be used as a starting point or sub-model for other models, simulations, or process flows. For example, Surrogate data may be used as input into a subsequent analytical or simulation process, such as pressure data being used as an input to an acoustic prediction model, which may be a CFD/CAE simulation model, a series of calculations, or another Surrogate.

FIG. 1(*a*) illustrates an efficient process for determining an optimal set of design specifications for a single wind turbine. It also trains a wind turbine (WT) surrogate to be able to "predict", for a given design, the output parameters, metrics, and fields. For example, the trained single wind turbine (WT) surrogate model may be used to predict the downstream flow field from the turbine (the wake field), based on one or more inflow conditions. In addition, it will be able to predict the power generated by the turbine, and, if desired, the noise and the internal values for temperature and structural stress.

A trained surrogate model can take air/wind inflow conditions and produce an outflow after the turbine (downstream) in a computationally efficient manner and do so for different turbine configurations or specifications. This can be considered as one surrogate able to handle multiple different configurations or specifications, or as a family of surrogates, each appropriate for a different configuration or specification (i.e., one surrogate for each turbine and configuration of structure and operating parameters).

As disclosed, in some embodiments, instead of using an optimized design for a turbine (which may include one or more parameters or variables that may be adjusted in a subsequent optimization stage), the disclosed approach may also be used with a set of existing turbines that are to be arranged into a wind farm. The set of turbines may include a set of available configurations (i.e., mast height, blade type, or cooler size with some having adjustable characteristics), and in that case it is desirable to determine an optimized layout for a wind farm using one or more these configurations.

In such a use case, the disclosed approach operates to determine a position and turbine configuration (from the available ones, which as mentioned, may vary in certain characteristics) for a set of turbines to form a wind farm that has been optimized based on a goal or objective (and may be subject to one or more constraints). Thus, in the situation of manufactured and deployable turbines, embodiments operate to determine a wind farm layout using one or more of the available turbine configurations, instead of optimizing the design of a single turbine and then siting a set of the optimized turbines based on that design.

FIG. 1(*b*) is a flowchart or flow diagram illustrating a method, process, set of operations, or set of functions for using an ensemble of (a) the optimized geometry or parameters for a single wind turbine or (b) a set of manufactured and deployable turbines, some having different configurations, to represent a wind farm and to optimize the performance of the wind farm by determining a desirable siting or placement of each turbine, in accordance with some embodiments.

The process flow illustrated in FIG. 1(*a*) is represented by steps or stages 130, 132, and 134 in FIG. 1(*b*). Note that this is shown as being optional, as in some situations optimization of the design of a single turbine may be replaced by a set of deployable turbines, with some having different configurations.

After a Surrogate DLNN/DL Model for a single wind turbine is trained (or a limited number of deployable turbine configurations are identified), it (or they) may be used to assist in the design of a wind farm (WF) by performing the following steps, stages, operations, functions, or processes (as suggested by FIG. 1(*b*)):

- Model the windfarm as a set of N optimized single wind turbine (DLNN) surrogate models generated from the process flow described with reference to FIG. 1(*a*);
  - As mentioned, instead a limited number of available (deployable) turbine configurations may be used to form the set of N turbines;
    - As a non-limiting example, in the case where one or more turbines are already in production and the turbine(s) were not subject to an optimization process, the disclosed approach can be implemented by generating training data by one or both of (a) changing configurations and running those inputs through CFD under the control of a human, or in a prescribed order and/or (b) using an optimizer to change configurations and running that through CFD under the control of an optimizer;
      - The optimized turbine or turbines may then be used to form an ensemble (as described in greater detail herein);
- Arrange the set of N single wind turbine surrogate models (or the selected deployable turbine configuration(s)) in a layout (which may be varied as part of the overall optimization process), where the layout and turbine configuration for each of the N turbines may include one or more of (as suggested by step or stage 136):
  - A layout location, spacing, offset, and orientation of each wind turbine;
    - Or, more generally, the position (x,y) of each turbine in a map of the site and each turbine's yaw direction (typically referred to as the "siting" of the wind turbines in the wind farm);
  - Site or landscape features or contours (which may impact the height or orientation of one or more of the turbines);
  - A set of (initial) configurations for each of the N wind turbines (blade type, tower height, rated power, cooling configuration, as non-limiting examples);
- Form an ensemble of the N single wind turbine surrogate models (or the selected deployable turbine configurations) into one single wind farm surrogate based on the defined arrangement of the set of N wind turbines from step or stage 136 (as suggested by step or stage 138, and described further herein);
  - The ensemble of N surrogate models is defined/operated in such a way as to identify the "upstream" turbines for each wind turbine in the farm. This identification can be made by observing the flow field (the wake) of the upstream surrogates and determining whether this wake intersects the input flow field of a downstream wind turbine, under a variety of conditions representing the wind variation at the site;
    - the total (sum) of the wakes of all upstream turbines (with the optional feature that the individual contributions into the sum of the wakes may be weighted numerically), plus the background undisturbed flow field (the flow field which is not subject to any wake effect) then forms the input for the downstream turbines (as illustrated in FIG. 1(*e*));
  - In one example of an inter-connected scenario, all turbines affect each other. Note that there is no requirement for each column in FIG. 1(*e*) to have the same number of surrogate turbines, $n_y$; some elements of the matrix $n_y/n_x$ may be missing, representing a lack of a turbine at that location, for reasons the siting team may determine (such as inaccessible ground, or a protected area, as examples), and with the option that some elements may be weighted numerically;
  - Using the wind farm ensemble surrogate model (for example, as shown in FIG. 1(*e*)), generate a prediction of the total power output of the wind farm based on the wind farm layout and the wind turbine configuration(s), which may vary amongst the turbines used in the wind farm;
- Optimize the wind farm layout by iteratively changing the layout and/or the wind turbine specifications/design, until the optimal total yearly (or over another time frame) wind farm power output has been achieved (as suggested by step or stage 140), typically balanced again the cost of the equipment and building of the site;
  - The optimal configuration may be achieved by using ML optimizers in an iterative loop, and the optimal solution may include consideration of constraints, such as acoustic noise, construction or operating cost, minimum power output, or structural limitations, one or more of which can be predicted in a subsequent calculation by an additional DLNN;
  - A result of the optimization process for the wind farm surrogate will be a "best" or desirable layout and configuration of the N turbines for a wind farm, including the power produced under various environmental conditions (such as wind speed profile at the wind farm site, air temperature, or air density, as non-limiting examples);
    - This feature distinguishes embodiments of the disclosure from conventional approaches. Applying the optimization process flow to the wind farm surrogate model, which has been pre-trained and adapted to process input data more efficiently in the form being used (as indicated by a data representation layer formed in the surrogate model), results in a more computationally efficient (and in many cases, more accurate) model. The computational effort is spent on making an accurate surrogate of one wind turbine (or optionally, of a few surrogates with different configurations, such as tower heights or blade types), which is then scaled to a whole site using many such trained surrogates, thereby providing a computationally faster and less expensive process to perform. This enables (in a shorter timeframe) deeper and more extensive investigation and optimization of turbine siting arrangements, and if desired, may be performed in conjunction with optimizing turbine design or operational parameters and/or configurations;

The conventional alternative, which is to perform CFD modeling for a full wind farm with one turbine type and then explore different turbine configurations and/or siting(s) for the farm, means that many tens or hundreds (or more) CFD runs have to be executed, which is expensive and time consuming. It also tends to yield a less optimized outcome by virtue of the reduced number of CFD runs feasible in a given amount of time, resulting in lower wind farm output due to the lower degree of optimization achieved. By deploying a deep learning surrogate of the types of DLNNs disclosed herein, a CFD-like substitute is created, which provides CFD-like prediction accuracy at much faster computational speed (e.g., typically less than one second, as opposed to many days for a CFD evaluation);

Optionally, and as a validation step, the DLNN-determined optimized layout or siting arrangement may be evaluated using a CFD/CAE application to ensure it produces the performance predicted from the optimization process (as suggested by step or stage 141);

The optimized wind farm layout and turbine configurations or specifications as represented by the ensemble or surrogate may be used as part of a control system for a wind farm by varying the real-time pitch and yaw angles of individual wind turbines to optimize the wind farm power output, with considerations of noise and stresses on the turbine components (as non-limiting examples), as suggested by step or stage 142;

This may take into consideration the environmental conditions (wind speed profile at wind farm site, air temperature, and/or air density, as non-limiting examples);

In contrast, real-time control is not practical using real-time CFD simulations, which may take several hours (or longer) to solve at a similar level of accuracy, while using the DLNN surrogate can solve flow fields within a second (typically) and thus enables a form of real-time control where the real-time controller feedback includes the full wind farm performance.

FIGS. 1(*c*) through 1(*i*) are a set of flowcharts or flow diagrams illustrating details of one or more of the processing steps or stages illustrated in FIGS. 1(*a*) and 1(*b*).

FIG. 1(*c*) illustrates an optimization process for a single wind turbine CAE/CFD calculations. As shown in the figure, the process flow may include the following steps or stages:

Definition of the input parameters for each turbine and/or setting;

Blade geometry is defined by a number of design or morphing parameters (radius or length, as non-limiting examples);

Environmental parameters/fields such as landscape, upstream inlet flow fields, and other scalar parameters may be defined;

As each iteration is performed, the new/updated turbine geometry is sent to the CFD software for modeling;

CFD simulation software meshes the simulation domain, then simulates fluid flow. This is done by solving differential equations (Navier-Stokes or Lattice-Boltzmann) at each time step and evaluating the new geometry for flow performance;

This stage of the data processing is fully automated (i.e., the meshing, solving, and data export);

The post-processing stage extracts and calculates key metrics for the optimization (e.g., objectives such as pressure drop or heat exchange, or constraints such as maximum temperature not to exceed) and provides the calculation of the objectives and constraint values back to the optimizer;

A "good" result is one with greater turbine energy generated;

This definition may be varied to account for a multi-factor optimization goal or objective (such as one that includes noise level, component stress, or other factors of interest);

The ML Optimizer "learns" and decides based on one or more key metric outcomes which design parameters (geometry) to run next and initiates a next round of simulation;

The optimizer stops the optimization if targets are met, or a fixed number of iterations is reached;

Many types or classes of optimizers may be used, but typically Bayesian, gradient based, or genetic algorithm (or a mix of multiple ones) are used;

A Design of Experiments (DoE) approach can be used instead of optimization, or in combination with optimization.

A process for training a single wind turbine surrogate using CFD optimization results may include the following steps or stages:

The inputs can be wind turbine configurations (e.g., blade type, tower height), scalar parameters (air temperature, air density, blade pitch angle, or turbine yaw angle, as non-limiting examples), a geometry mesh (e.g., for a landscape) and upstream input flow fields (e.g., velocities in a volume or across a plane, vorticity, or other parameters of interest in defining the flow field, such a wind shear or wind veer);

The process operates to improve the surrogate by changing inputs, outputs, neural network architecture, data augmentation techniques, and hyper-parameters until the prediction accuracy is acceptable or sufficient;

In one embodiment, the surrogate training uses a technique such as back-propagation. The untrained surrogate has many unknown variables in the neural network (e.g., the weights of connections between nodes, as an example) which can be approximately calculated by back propagation if one knows both the input and the output.

FIG. 1(*d*) illustrates a flowchart of a surrogate training process. As shown in the figure, the process flow may include the following steps or stages:

- Data may first be processed to prepare it for use—this may include one or more of:
  - Data download and/or upload to a workspace, unpacking and organizing data if needed;
  - For CFD, the data is geometry data (meshes), fluid flow data (velocities and pressures) on surfaces and in volumes as represented by surface and volume meshes;
- Extract geometry/mesh, fields and scalars used for training (note that not all CFD data is useful, so extract what is needed), and convert data into formats that work with the DL model (e.g., a DLNN);
- Split data samples into training data and a test set—can be randomly assigned (by a percentage), manually assigned, or based on a custom algorithm. In many cases, roughly 85% is training data, with the rest being test (or validation) data;
- Pre-processing may include normalization of model inputs and outputs (e.g., rescaling for similar scales 0-1), computing statistics, and outlier removal (if needed);
- Set up training configuration (DLNN inputs, outputs, number of steps, or other parameters), and train DLNN using back-propagation (or other suitable process);
- Execute/run surrogate model to generate predictions on training and test data sets to evaluate model, and compute correlation metrics ($R^2$, I1) between the model prediction and the CFD data reserved for testing;
  - Change and tune model hyper-parameters (for example, the DLNN layers, the learning rate, the weights of the overall loss function, batch size and number of epochs, as non-limiting examples), as well as applying data augmentation techniques (for example, random shift and random rotation, dropout) iteratively;
    - This is typically done until the correlation $R^2$ of both the test data and the training data is improved by bringing $R^2$ closer to 1;
- Compute custom metrics and fields (pressure, velocity, or temperature, as examples), Visualize scalar and field predictions (if desired), and convert and export results if needed.

FIG. 1(*e*) illustrates a flowchart of a process for forming a wind farm surrogate from an ensemble of multiple wind turbine surrogates (or deployable turbine configurations). As shown in the figure, the process flow may include the following steps or stages:

- Multiple individual wind turbine surrogates (or deployable turbines) can be combined to represent a wind farm with N number of wind turbines. Individual wind turbine surrogates can receive information from upstream surrogate(s) to be used as input for the model prediction, which is then used as input for the next downstream surrogate(s). The structure of the wind farm surrogate ensemble is defined by the position (and in some cases, the orientation) of each individual wind turbine. The wind farm surrogate formed from the ensemble can be treated as a single wind farm surrogate, which can then be used in the optimization process for the wind farm;
  - If the turbines are not in a rectangular array, the method may be used for an arbitrary array. As before, multiple upstream turbines define the wind inflow for downstream turbines;
    - The ensemble of N surrogate models is defined/operated in such a way as to identify the "upstream" turbines for each wind turbine in the farm. This identification can be made by observing the flow field (the wake) of the upstream surrogates and determining whether this wake intersects the input flow field of a downstream wind turbine, under a variety of conditions representing the wind variation of the site;
      - The total (sum) of the wakes of all upstream turbines, plus the background undisturbed flow field (the flow field which is not subject to any wake effect) then forms the input for the downstream turbines (as illustrated in FIG. 1(*e*));
    - In one example of an inter-connected scenario, all turbines affect each other. Note that there is no requirement for each column in FIG. 1(*e*) to have the same number of surrogate turbines, $n_y$; some elements of the matrix $n_y/n_x$ may be missing, representing a lack of a turbine at that location, for reasons the siting team may determine (such as inaccessible ground, or a protected area, as examples).

FIG. 1(*f*) illustrates a flowchart of a process for optimizing a wind farm surrogate from an ensemble of multiple wind turbine surrogates or deployable turbines (with associated configurations). For a wind farm at a given site to be optimized, typically the climate is known and prescribed by a number for parameters in fixed time intervals (sometimes every 10 minutes for a full year or more), where such parameters are for example wind speed, wind direction, air pressure, air temperature, air humidity, wind shear, wind veer and potentially the full wind vector field in a volume or across a surface. As shown in the figure, the process flow may include the following steps or stages:

- A turbine configuration is specified (e.g., tower height, cooling configuration, generator, gearbox, control system parameters, blade types, as non-limiting examples). In some cases, this may be as detailed as a blade geometry defined by a number of design or morphing parameters (radius or length, as examples);
- The individual wind turbine positions and configurations may be varied to find an optimal wind farm layout;
- Instead of the CFD simulation, the process uses a wind farm surrogate in evaluating a new configuration or layout of the N turbines in the wind farm;
  - This can also include a geometric mesh in addition to parameters, when the surrogate is a geometric deep learning surrogate;
- The post-processing extracts and calculates key metrics for the evaluation or optimization, and may include constraints, and provides these to the optimizer;
- The uncertainty prediction is a prediction of the uncertainty in the results for each geometry or arrangement, and may be performed as follows:
  - Prediction uncertainty can (for example) be calculated using the ensemble technique, where multiple models with a different initial seed are trained and used during model prediction. These ensemble models will give slightly different predictions for the same input geometry, and the more these predictions deviate, the greater the prediction uncertainty;
  - Prediction uncertainty can be used as a threshold to determine if the DLNN prediction is not of sufficient quality in order to initiate a recursive loop and to re-train the DLNN model (as suggested by in FIG. 1(*g*));

The surrogate optimizer learns and decides based on key metric outcomes which turbine configurations to alter and run next, and initiates the next round of evaluation;

It also stops the optimization process (i.e., no further iterations) if targets are met or a pre-determined number of iterations is reached;

The optimizer is typically (although not exclusively) a genetic, gradient-based or Bayesian optimizer.

FIG. 1(*g*) illustrates the overall process for a recursive training loop using CAE/CFD results. As shown in the figure, the process flow for the recursive or iterative loop may include the following steps or stages:

Calculate prediction uncertainty for a specific geometry;

Determine if an uncertainty threshold value is exceeded/violated;

If "yes", then run the violating geometry through a CAE simulation;

Add the simulation results to training data set and re-train model;

Update surrogate model and continue the optimization process;

As suggested, the surrogate can estimate prediction uncertainty for each new geometry, and that can be used as a trigger to initiate a new CAE simulation if it has too high an uncertainly, followed by re-training the surrogate model using that additional result to improve the model (as suggested by the recursive loop);

In place of "geometry" in FIG. 1(*g*), one could use the wind turbine configuration or characteristics.

FIG. 1(*h*) illustrates a flowchart of the validation of a surrogate result with CAE/CFD. As shown in the figure, the process flow may include the following steps or stages:

In order to check if the surrogate is as "good" as the CAE/CFD model, one can validate by running the same geometry (or configuration) through both;

This is particularly useful when the surrogate has been used after a lengthy optimization to derive a completely new geometry (or configuration), which might not have been designed before. Thus, it is good practice to check that this geometry (or configuration) performs as well in CAE/CFD simulations as the surrogate predicts it will perform;

If it does, then the process is completed. If it doesn't, one can either retrain the surrogate so it predicts better or use another one of the many geometries (or configurations) the surrogate suggested to see if that geometry (or configuration) performs better.

FIG. 1(*i*) illustrates a flowchart of a process for the efficient generation of data using multiple recursive loops. As shown in the figure, the process flow may include the following steps or stages:

Recursive loop 1 provides efficiently generates training data using a Bayesian optimizer (or other form of optimizer);

Recursive loop 2 sends an optimized geometry (or configuration) back to CFD for retraining (after the first optimization); and Recursive loop 3 sends an optimized geometry (or configuration) back to CFD for validation and/or retraining (after the second optimization).

As suggested by FIG. 1(*i*), to minimize the amount of CAE/CFD cycles needed to train the model, an efficient Bayesian optimizer is used as part of recursive loop 1. This pre-optimized data can then be combined with potentially already existing data to form the data set for the DLNN surrogate model training. As this surrogate model is training, it can replace the CAE and be used for optimization (as suggested by FIG. 1(*g*)).

For optimization, multiple types of geometry (or configuration) creation can be used and combined (in the situation illustrated in FIG. 1(*i*), a parametrizer is sequentially combined with a mesh morpher). During each surrogate inference/prediction cycle, the prediction uncertainty will be calculated, and when it is above a certain threshold, this triggers the recursive loop 2 to run this geometry (or configuration) through the CAE/CFD software and re-train the DL model (as suggested by FIG. 1(*i*)). This is the approach used for each step of a possible multi-step optimization. After the optimization finishes, there will be one or a few "best" optimized geometries (or configurations), which will then be validated via CAE/CFD through recursive loop 3.

Figure 2:
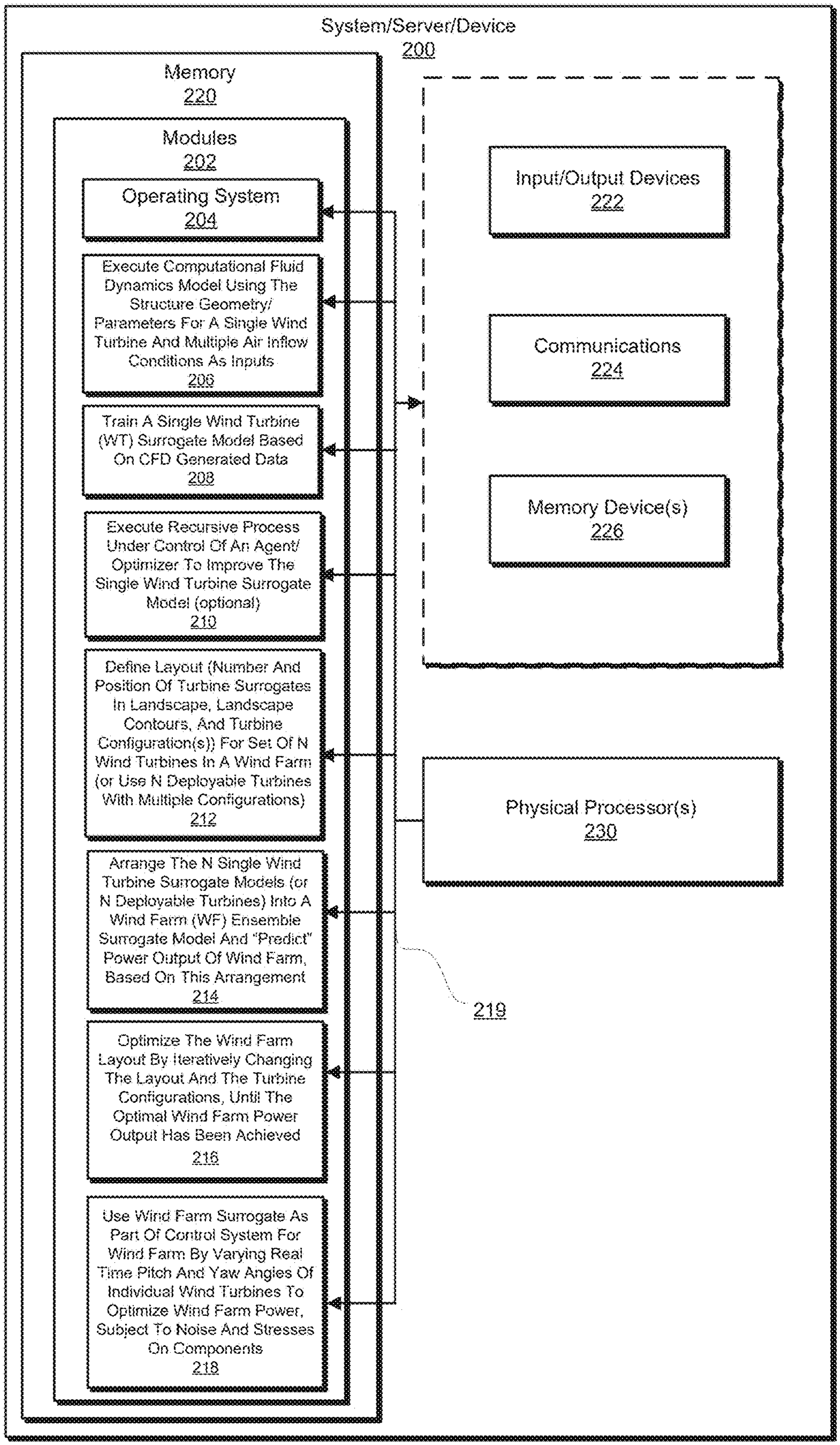
FIG. 2 is a diagram illustrating elements, components, or processes that may be present in or executed by one or more of a computing device, server, platform, or system configured to implement a method, process, function, or operation in accordance with an embodiment of the systems, apparatuses, and methods disclosed herein.

FIG. 2 is a diagram illustrating elements, components, or processes that may be present in or executed by one or more of a computing device, server, platform, or system configured to implement a method, process, function, or operation in accordance with an embodiment of the disclosed systems, apparatuses, and methods. In some embodiments, the disclosed system and methods may be implemented in the form of an apparatus or apparatuses (such as a server that is part of a system or platform, or a client device) that includes a processing element and a set of executable instructions stored in a memory or data storage component (such as one or more non-transitory computer-readable media). The executable instructions may be part of a software application (or applications) and arranged into a software architecture.

In general, an embodiment may be implemented using a set of software instructions that are designed to be executed by a suitably programmed processing element (such as a GPU, CPU, TPU, QPU, microprocessor, processor, co-processor, controller, or state machine, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the disclosed systems, apparatuses, and methods.

The application modules and/or sub-modules may include any suitable computer-executable code or set of instructions (e.g., as would be executed by a suitably programmed processor, microprocessor, co-processor, or CPU), such as computer-executable code corresponding to a programming language. For example, programming language source code may be compiled into computer-executable code. Alternatively, or in addition, the programming language may be an interpreted programming language such as a scripting language.

The modules may contain one or more sets of instructions for performing a method or function described with reference to the Figures, and the disclosure and/or descriptions of the functions and operations provided herein. These modules may include those illustrated but may also include a greater number or fewer number than those illustrated.

Each module may contain a set of computer-executable instructions. The set of instructions may be executed by a programmed processor contained in a server, client device, network element, system, platform, or other component. Some or all the computer-executable instructions that are contained in the modules or in a specific module may be executed by the same processor or by different processors. If executed by more than a single processor, the processors (or co-processors) may be contained in different devices, for example a processor in a client device and a processor in a server.

The computer-executable instructions that are contained in a single module may be executed (in whole or in part) by one processor or by more than one processor or co-processor. A module may contain instructions that are executed by a processor contained in more than one of a server, client device, network element, system, platform, or other component. In some embodiments, a plurality of electronic processors, with each being part of a separate device, server, or system may be responsible for executing all or a portion of the software instructions contained in an illustrated module. Thus, although FIG. 2 illustrates a set of modules which taken together perform multiple functions or operations, these functions or operations may be performed by different devices or system elements, with certain of the modules (or instructions contained in those modules) being associated with those devices or system elements.

As shown in FIG. 2, system 200 may represent a server or other form of computing or data processing system, platform, or device. Modules 202 each contain a set of executable instructions, where when the set of instructions is executed by a suitable electronic processor (such as that indicated in the figure by "Physical Processor(s) 230"), system (or server, or device) 200 operates to perform a specific process, operation, function, or method.

Modules 202 are stored in a memory 220, which typically includes an Operating System module 204 that contains instructions used (among other functions) to access and control the execution of the instructions contained in other modules. The modules 202 in memory 220 are accessed for purposes of transferring data and executing instructions by use of a "bus" or communications line 219, which serves to permit processor(s) 230 to communicate with the modules for purposes of accessing and executing instructions. Bus or communications line 219 also permits processor(s) 230 to interact with other elements of system 200, such as input or output devices 222, communications elements 224 for exchanging data and information with devices external to system 200, and additional memory devices 226.

Each module or sub-module may correspond to a specific function, method, process, or operation that is implemented by execution of the instructions (in whole or in part) in the module or sub-module. Each module or sub-module may contain a set of computer-executable instructions that when executed by one or by multiple programmed processors or co-processors cause the processors or co-processors (or a device, devices, server, or servers in which they are contained) to perform the specific function, method, process, or operation. Such function, method, process, or operation may include those used to implement one or more aspects of the disclosed system and methods, such as for:

- Executing a Computational Fluid Dynamics (CFD) Model Using the Configurations, which may include Geometry for A Single Wind Turbine and Multiple Air Inflow Conditions as Inputs (as suggested by module 206);
  - this operates to generate training data for the single wind turbine surrogate model (i.e., the DLNN or similar computational model);
- Training A Single Wind Turbine (WT) Surrogate (DLNN) Model Based on CFD Generated Data (as suggested by module 208);
- Executing A Recursive Process Under Control of An Agent (such as an Optimizer) To Improve the Single Wind Turbine Surrogate Model, As Triggered by Surrogate Prediction Uncertainty (optional) (module 210);
- Defining A Layout (e.g., The Number and Position of a Set of Wind Turbine Surrogates (or deployable turbines with associated configurations) In the Landscape, The Landscape Contours, and the Turbine Configurations (blade type or geometry, tower heights, cooling configuration, yaw or pitch parameters, as non-limiting examples) for a Set of N Wind Turbines (WT) In a Wind Farm (WF) (module 212);
  - In the case where one or more turbines are already in production and the turbine(s) were not subject to an optimization process, the disclosed approach can be implemented by generating training data by one or both of (a) changing configurations and running those inputs through CFD under the control of a human, or in a prescribed order and/or (b) using an optimizer to change configurations and running that through CFD under the control of an optimizer;
  - The optimized turbine or turbines may then be used to form an ensemble (as described herein);
- Arranging the N Single Wind Turbine Surrogate Models into a Wind Farm (WF) Ensemble Surrogate Model and Generating a Prediction of the Power Output of the Wind Farm, Based on This Arrangement (module 214);
- Optimizing the Wind Farm Layout by Iteratively Changing the Layout and/or the Turbine Configurations, Until the Optimal Total Wind Farm Power Output Has Been Achieved. The optimal layout and configuration(s) may be achieved by using ML optimizers in a feedback loop, and the optimal solution may incorporate constraints, such as acoustic noise or include subsequent analytical, simulated, or other DLNN-based steps which suggest further constraints, metrics, or performance (module 216); and
- Using the Wind Farm (WF) Surrogate Model as Part of a Control System for a Wind Farm by Varying Real Time Pitch and Yaw Angles of Individual Wind Turbines to Optimize Wind Farm Power, and Reduce Noise and Stresses on Components (optional, and as suggested by module 218).

Figure 3:
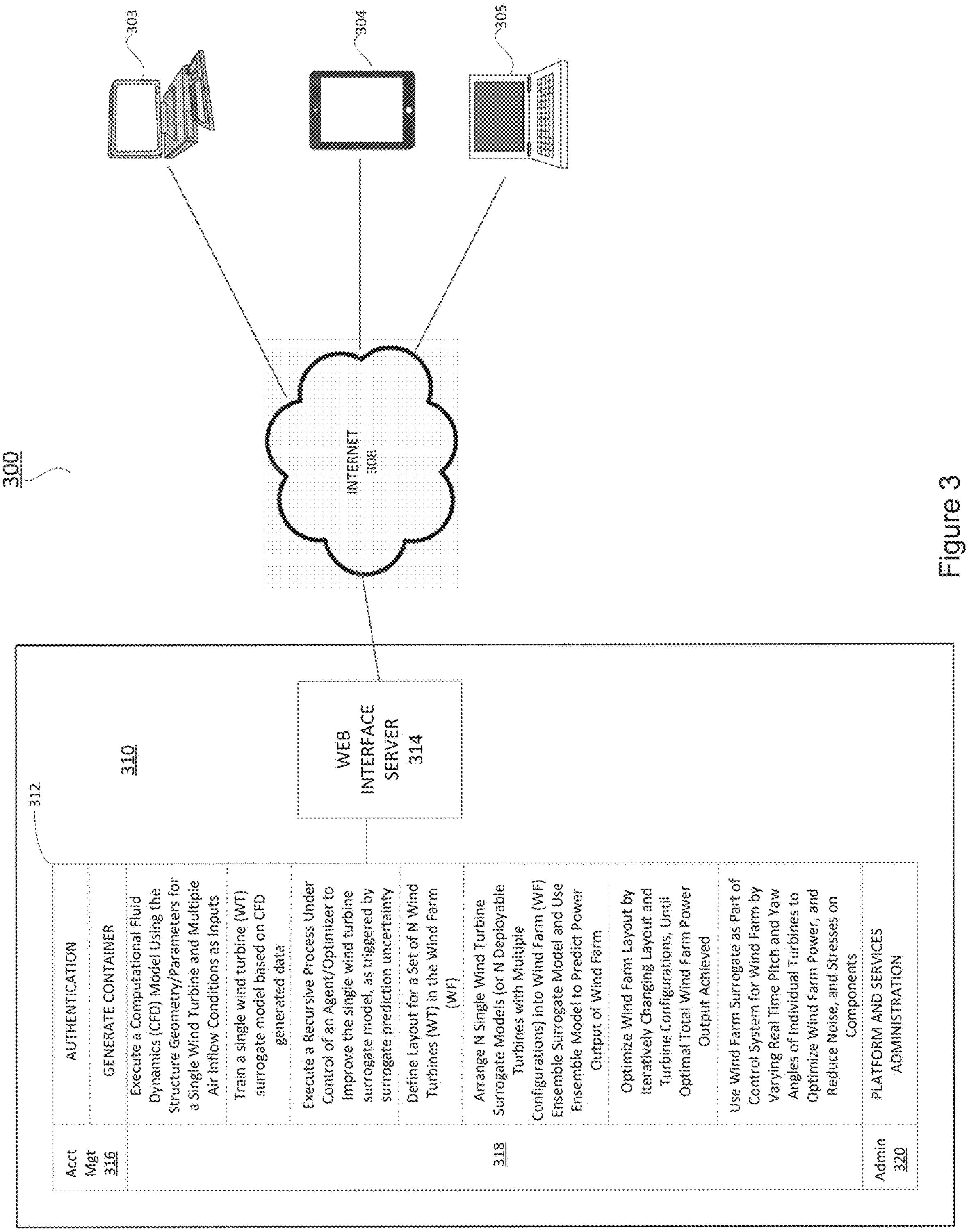
FIGS. 3-5 are diagrams illustrating an architecture for a multi-tenant or SaaS platform that may be used in implementing an embodiment of the systems and methods disclosed herein.
Figure 4:
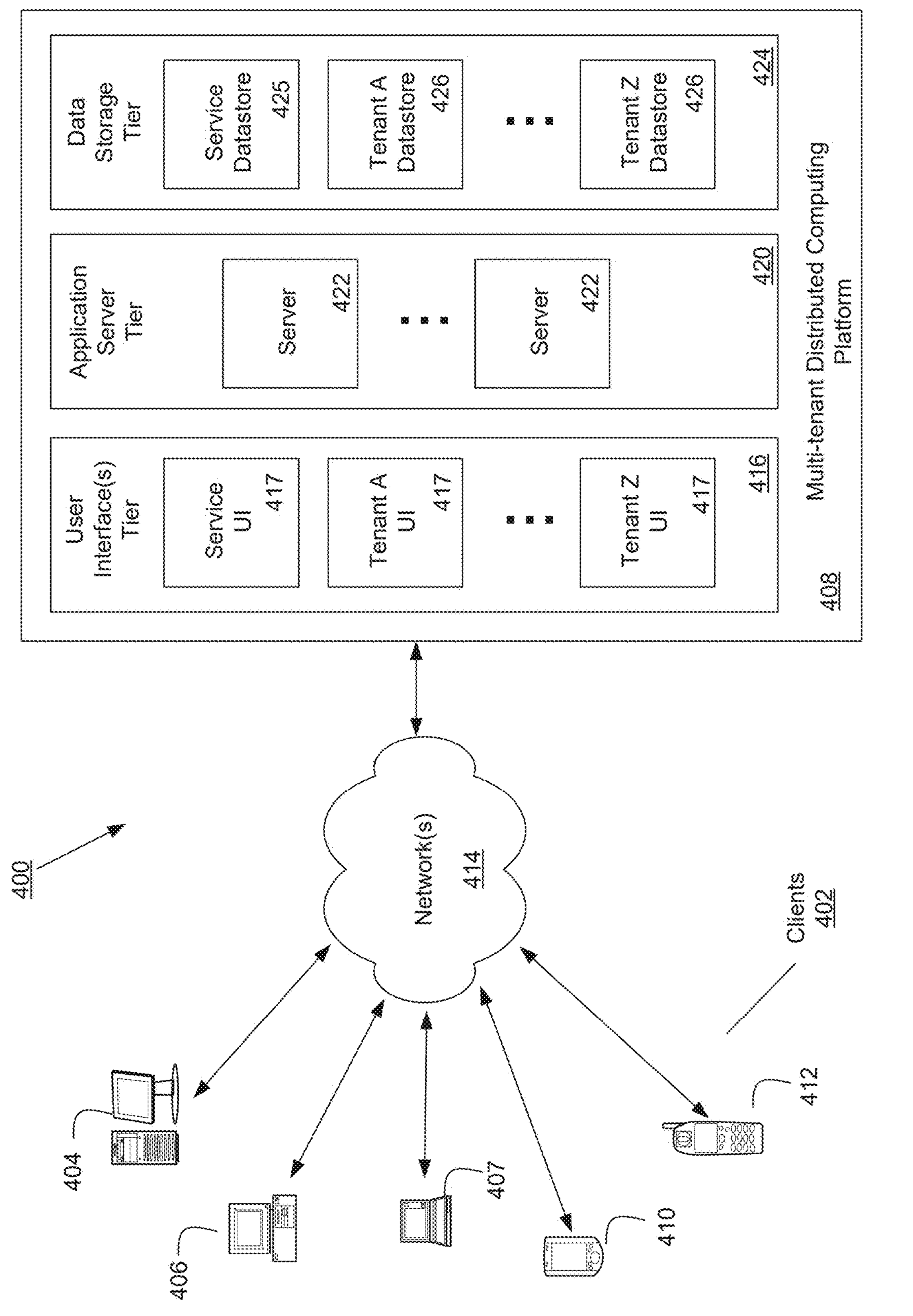
Figure 5:
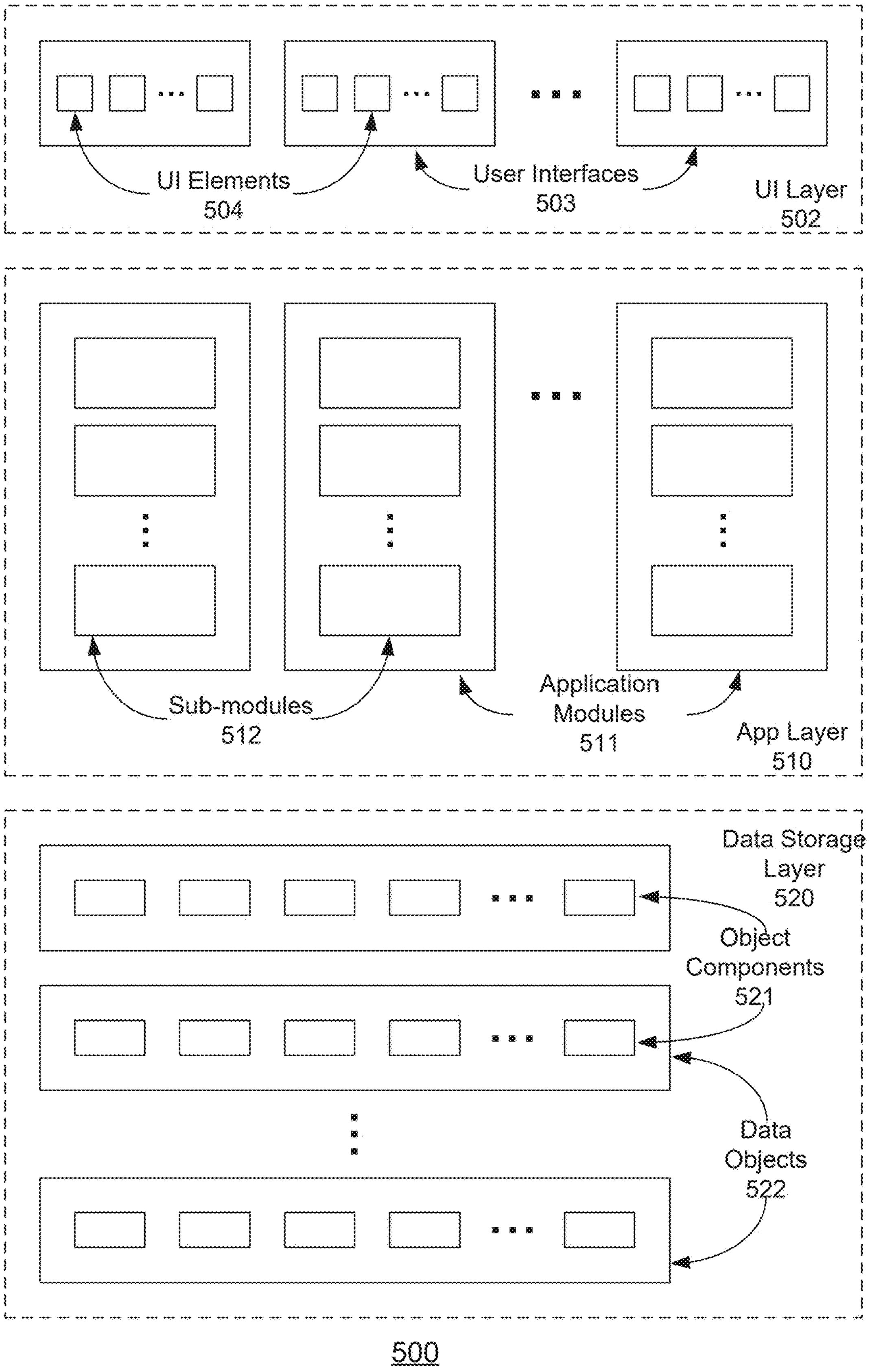
Figure 7:
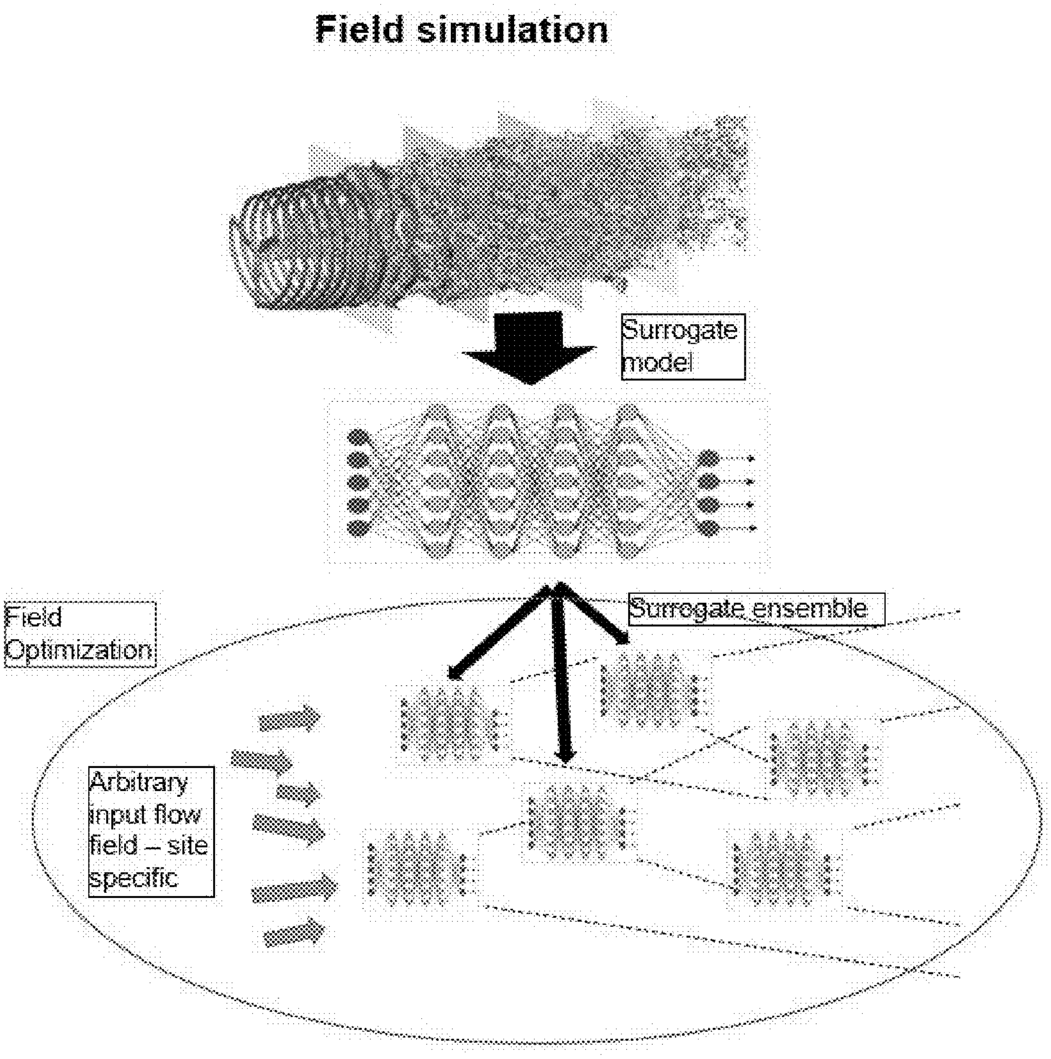
FIG. 7 is a diagram illustrating how the vector field components Vi(x,y) from one or more (typically all) upstream turbines may be summed to form the input V(x,y) for a downstream turbine.

In some embodiments, the functionality and services provided by the system and methods disclosed and/or described herein may be made available to multiple users by accessing an account maintained by a server or service platform. Such a server or service platform may be termed a form of Software-as-a-Service (SaaS). FIG. 3 is a diagram illustrating a SaaS system in which an embodiment may be implemented. FIG. 4 is a diagram illustrating elements or components of an example operating environment in which an embodiment may be implemented. FIG. 5 is a diagram illustrating additional details of the elements or components of the multi-tenant distributed computing service platform of FIG. 4, in which an embodiment may be implemented.

In some embodiments, the system or services disclosed and/or described herein may be implemented as micro-services, processes, workflows, or functions performed in response to the submission of a user's responses. The micro-services, processes, workflows, or functions may be performed by a server, data processing element, platform, or system. In some embodiments, the services may be provided by a service platform located "in the cloud". In such embodiments, the platform may be accessible through APIs and SDKs. The functions, processes and capabilities disclosed and/or described herein may be provided as micro-services within the platform. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 3-5 illustrate a multi-tenant or SaaS architecture that may be used for the delivery of business-related or other applications and services to multiple accounts/users, such an architecture may also be used to deliver other types of data processing services and provide access to other applications. Although in some embodiments, a platform or system of the type illustrated in FIGS. 3-5 may be operated by a 3rd party provider to provide a specific set of business-related applications, in other embodiments, the platform may be operated by a provider and a different business may provide the applications or services for users through the platform.

FIG. 3 is a diagram illustrating a system 300 in which an embodiment may be implemented or through which an embodiment of the services disclosed and/or described herein may be accessed. In accordance with the advantages of an application service provider (ASP) hosted business service system (such as a multi-tenant data processing platform), users of the services may comprise individuals, businesses, stores, organizations, or specific wind farm locations, as non-limiting examples A user may access the services using a suitable client, including but not limited to desktop computers, laptop computers, tablet computers, scanners, or smartphones. In general, a client device having access to the Internet may be used to access and interact with the service platform. A user interfaces with the service platform across the Internet 308 or another suitable communications network or combination of networks. Examples of suitable client devices illustrated include desktop computers 303, smartphones or tablet computers 304, or laptop computers 305.

System 310, which may be hosted by a third party, may include a set of services 312 to assist a user to configure and develop a "surrogate" model for a wind farm formed from a set of N individual surrogate models (or deployable turbines with associated configurations), with each such model representing a wind turbine, and a web interface server 314, coupled as shown in FIG. 3. It is to be appreciated that either or both the services 312 and the web interface server 314 may be implemented on one or more different and separate hardware systems and components, even though represented as singular units in FIG. 3.

Services 312 may include one or more functions or operations for enabling a user to configure a wind farm model as a set of individual optimized surrogate wind turbine models (or deployable turbines with associated configurations) and execute the wind farm model under a variety of conditions to determine an optimized set of turbine locations and configurations (such as specifications) to produce maximum power from the wind farm (or to satisfy other form of cost function or objective).

As examples, in some embodiments, the set of functions, operations or services made available through the platform or system 310 may include:

- Account Management services 316, such as
  - a process or service to authenticate a user (in conjunction with submission of a user's credentials using the client device);
  - a process or service to generate a container or instantiation of the services or applications that will be made available to the user;
- User Input Data Processing services 318, such as
  - a process or service to Execute a Computational Fluid Dynamics (CFD) Model Using the Structure Geometry/Parameters for a Single Wind Turbine and Multiple Air Inflow Conditions as Inputs;
    - this operates to generate training data for the single wind turbine surrogate model;
  - a process or service to Train a Single Wind Turbine (WT) Surrogate Model based on CFD generated data;
  - a process or service to Execute a Recursive Process Under Control of an Agent/Optimizer to Improve the Single Wind Turbine Surrogate Model, as triggered by surrogate prediction uncertainty (this may be optional);
  - a process or service to Define a Layout (the number and position of the wind turbine surrogates or deployable turbine configurations in the landscape, the landscape contours, and the turbine configurations) for a Set of N Wind Turbines (WT) in a Wind Farm (WF);
  - a process or service to Arrange the N Single Wind Turbine Surrogate Models (which may be all the same, or varying in configuration/design) into a wind farm (WF) ensemble surrogate model and use the ensemble model to predict the power output of the wind farm, based on this arrangement;
    - as disclosed, the single wind turbine models may be replaced by a set of deployable turbines, each with an associated configuration;
      - in the case where one or more turbines are already in production and the turbine(s) were not subject to an optimization process, the disclosed approach can be implemented by generating training data by one or both of (a) changing configurations and running those inputs through CFD under the control of a human, or in a prescribed order and/or (b) using an optimizer to change configurations and running that through CFD under the control of an optimizer; the optimized turbine or turbines may then be used to form an ensemble (as described herein);
  - a process or service to Optimize the wind farm layout by iteratively changing the layout and the turbine configurations or specifications, until the optimal total wind farm power output has been achieved. The optimal layout may be achieved by using ML optimizers in a feedback loop, and the optimal solution may incorporate constraints, such as acoustic noise or structural stress, or include subsequent analytical, simulated, or other DLNN steps which suggest further constraints, metrics, or performance;
  - a process or service to use the Wind Farm (WF) surrogate model as Part of a Control System for a Wind Farm by Varying Real Time Pitch and Yaw Angles of Individual Wind Turbines to Optimize Wind Farm power, and (if desired) reduce noise and stresses on components;
- Administrative services 320, such as
  - a process or services to enable the provider of the services and/or the platform to administer and configure the processes and services provided to users, such as by altering how a wind turbine is represented, the form of optimization used for the CFD model or the surrogate (DLNN) model, or how the output of the trained surrogate is used to form the ensemble of N turbine models, as non-limiting examples.

The platform or system shown in FIG. 3 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server. A web server is a most often a combination of hardware and the software that helps deliver content, commonly by hosting a website, to client web browsers that access the web server via the Internet.

FIG. 4 is a diagram illustrating elements or components of an example operating environment 400 in which an embodiment may be implemented. As shown, a variety of clients 402 incorporating and/or incorporated into a variety of computing devices may communicate with a multi-tenant service platform 408 through one or more networks 414. For example, a client may incorporate and/or be incorporated into a client application (i.e., software) implemented at least in part by one or more of the computing devices. Examples of suitable computing devices include personal computers, server computers 404, desktop computers 406, laptop computers 407, notebook computers, tablet computers or personal digital assistants (PDAs) 410, smart phones 412, cell phones, and consumer electronic devices incorporating one or more computing device components (such as one or more electronic processors, microprocessors, central processing units (CPU), or controllers). Examples of suitable networks 414 include networks utilizing wired and/or wireless communication technologies and networks operating in accordance with any suitable networking and/or communication protocol (e.g., the Internet).

The distributed computing service/platform (which may also be referred to as a multi-tenant data processing platform) 408 may include multiple processing tiers, including a user interface tier 416, an application server tier 420, and a data storage tier 424. The user interface tier 416 may maintain multiple user interfaces 417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as non-limiting examples. Each application server tier 420 or other form of processing tier shown in the figure may be implemented with a set of computers and/or components including computer servers 422 and processors, and may perform various functions, methods, processes, or operations as determined by the execution of a software application or set of instructions. The data storage tier 424 may include one or more data stores, which may include a Service Data store 425 and one or more Tenant Data stores 426. Data stores may be implemented with any suitable data storage technology, including structured query language (SQL) based relational database management systems (RDBMS).

Service Platform 408 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 422 that are part of the platform's Application Server Tier 420. As noted with regards to FIG. 3, the platform system shown in FIG. 4 may be hosted on a distributed computing system made up of at least one, but typically multiple, "servers."

As mentioned, rather than build and maintain such a platform or system themselves, a business may utilize systems provided by a third party. A third party may implement a business system/platform as disclosed and/or described herein in the context of a multi-tenant platform, where individual instantiations of a business' data processing workflow (such as the data analysis and model evaluation services and processing disclosed) are provided to users, with each business (or in one example, an operator or designer of a wind farm) representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 5 is a diagram illustrating additional details of the elements or components of the multi-tenant distributed computing service platform of FIG. 4, in which an embodiment may be implemented. The software architecture shown in FIG. 5 represents an example of an architecture which may be used to implement an embodiment of the disclosure. In general, an embodiment may be implemented using a set of software instructions that are designed to be executed by a suitably programmed processing element (such as a CPU, GPU, microprocessor, processor, controller, or computing device, as non-limiting examples). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 5 is a diagram illustrating additional details of the elements or components 500 of a multi-tenant distributed computing service platform, in which an embodiment may be implemented. The example architecture includes a user interface layer or tier 502 having one or more user interfaces 503. Examples of such user interfaces include graphical user interfaces and application programming interfaces (APIs). Each user interface may include one or more interface elements 504. For example, users may interact with interface elements to access functionality and/or data provided by application and/or data storage layers of the illustrated architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as a variety of controls, parameterized procedure calls, programmatic objects, and messaging protocols.

The application layer 510 may include one or more application modules 511, each having one or more sub-modules 512. Each application module 511 or sub-module 512 may correspond to a function, method, process, or operation that is implemented by the module or sub-module (e.g., a function or process related to providing data processing and services to a user of the platform). Such function, method, process, or operation may include those used to implement one or more aspects of the disclosed system and methods, such as for one or more of the processes or functions disclosed and/or described herein:

- a process to Execute a Computational Fluid Dynamics (CFD) Model Using the Structure Geometry/Parameters for a Single Wind Turbine and Multiple Air Inflow Conditions as Inputs;
- a process to Train a single wind turbine (WT) surrogate model (such as a DLNN) based on CFD generated data;
- a process to Execute a Recursive Process Under Control of an Agent/Optimizer to Improve the single wind turbine surrogate model, as triggered by surrogate prediction uncertainty;
- a process to Define a Layout (the number and position of the wind turbine surrogates (deployable turbines) in the landscape, the landscape contours, and the turbine specifications (power, pitch, yaw, height, or blade shape, as examples) for a Set of N Wind Turbines (WT) in the Wind Farm (WF);
- a process to Arrange the N single wind turbine Surrogate Models (and/or deployable turbine configurations) into a wind farm (WF) ensemble surrogate model and use the ensemble model to predict the power output of the wind farm based on this arrangement;
  - as disclosed, the single wind turbine models may be replaced by a set of deployable turbines, each with an associated configuration;
    - in the case where one or more turbines are already in production and the turbine(s) were not subject to an optimization process, the disclosed approach can be implemented by generating training data by one or both of (a) changing configurations and running those inputs through CFD under the control of a human, or in a prescribed order and/or (b) using an optimizer to change configurations and running that through CFD under the control of an optimizer;
    - the optimized turbine or turbines may then be used to form an ensemble (as described herein);
- a process to Optimize the wind farm layout by iteratively changing the layout and the turbine configurations or specifications, until the optimal total wind farm power output has been achieved. The optimal layout may be achieved by using ML optimizers in a feedback loop, and the optimal solution may incorporate constraints, such as acoustic noise or structural stress, wind farm cost, or include subsequent analytical, simulated, or other DLNN steps which suggest further constraints, metrics, or performance;
- a process to use the Wind Farm (WF) surrogate model as Part of a Control System for a Wind Farm by Varying Real Time Pitch and Yaw Angles of Individual Wind Turbines to Optimize Wind Farm power, and (if desired) reduce noise and stresses on components (if such factors are included as part of an optimization objective or goal).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 422 of FIG. 4) may include each application module. Alternatively, different application servers may include different sets of application modules. Such sets may be disjoint or overlapping.

The data storage layer 520 may include one or more data objects 522 each having one or more data object components 521, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 3-5 are not intended to be limiting examples. Further environments in which an embodiment of the disclosure may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

As additional, but non-limiting examples of embodiments, one or more of the following aspects may be implemented as part of a method, device, system, or platform:

- turbine components that may be specified as part of an evaluation, model, or to generate data may include, but are not be limited to, the shape of wind turbines exposed to a the external air flow, turbine nacelle internal air flow, nacelle internal cooling fluid flows, or turbine static and transient forces, as well as the resulting turbine acoustic sound waves or pressures, turbine electro-magnetic fields, turbine thermal considerations and heat transfer, or turbine power produced;
- input of surface contour shape of the site and/or the shape of the turbine as a plurality of points or a surface mesh into a Surrogate model for computing a prediction of at least one dynamic performance parameter of a turbine or set of turbines;
- the wind farm layout/siting may comprise one or more of the positioning, operation, or individual components of wind turbines, which may lend themselves to optimization of their positions, structure, geometry, materials or adjustable design parameters, their operational control algorithms and method of in-situ control, or control algorithms and method in a virtual development environment;

an optimization objective may be defined as a function of the shape of the technical device or placement of the wind turbine (or turbines) into the landscape and of the at least one performance dynamic parameter;

optimizing the shape of a wind turbine (or turbines) or the positioning of a wind turbine (or turbines) in the landscape using a genetic algorithm, a gradient descent algorithm or/and Bayesian optimizer;

a method wherein a convolution of the Surrogate comprises a circular convolution;

a method where the Surrogate comprises a first branch for computing the scalar fields along the contour of the wind turbine(s), wherein the first branch preferably comprises a fully-convolutional network;

a method where the Surrogate comprises a first branch for computing the performance dynamic parameters (scalars), and where the second branch preferably comprises a fully-connected network;

a system or method for optimizing the shape, design and operation of wind turbines and their positioning within a given landscape exposed to Fields with respect to at least one performance dynamic parameter, using a Deep Learning Neural Network (DLNN) for computing a prediction of the at least one performance dynamic parameter based on the plurality of points or a surface mesh;

a system or method for optimizing the shape of shape, design and operation of wind turbines and their positioning within a given landscape exposed to Fields with respect to at least one performance dynamic parameter, comprising a processor configured for discretizing the shape of the technical device into a plurality of points along the contour of the technical device or into a surface mesh;

a system or method for optimizing the shape, design and operation of wind turbines and their positioning within a given landscape exposed to Fields with respect to at least one performance dynamic parameter, comprising a processor configured for inputting the plurality of points or the surface mesh into a Deep Learning Neural Network (DLNN) for computing a prediction of the at least one performance dynamic parameter;

a system or method where a wind farm of wind turbines of number N is represented by virtual representation composed of Surrogates of number N, where each Surrogate is substantially same for each turbine save for some adjustable feature parameters. Each individual Surrogate can receive information from the upstream Surrogates in such a way that while the Surrogate is unmodified (save for adjustable features), the upstream input data, comprised of (but not limited to) wind speed, air density, temperature, and position causes the downstream Surrogate to produce output data, comprised of (but not limited to) wind speed, air density and temperature and Surrogate position;

a system or method where a number of proposed wind turbines and wind turbine positions represent a wind farm and are replaced and represented by a number of Surrogate wind turbines, some of which are interacting and affecting downstream Surrogates wind turbines ("Wake Effects");

a system or method where the system of Surrogate wind turbines are modified in their position in the landscape, in their numbers, in their specification, in their features, or in their adjustable operation parameters, such as (but not limited to) blade pitch angle and turbine yaw angle, or their operational control, to limit damage, excessive temperatures, or service intervals, to individual turbines from Wake Effects;

a system or method where a plurality of Surrogate wind turbines are modified in their position in the landscape, in their numbers, in their specification, in their features, in their adjustable operation parameters, or in their operational control, such as (but not limited to) blade pitch angle and turbine yaw angle, to limit power losses from Wake Effects, either in peak power produced, average power produced, or some weighted measure of power performance (such weighting for example, but not limited to include the electric rates which the wind farm operator or owner is paid);

a system or method where the system of Surrogate wind turbines are modified in their position in the landscape, in their numbers, in their specification, in their features, in their adjustable operation parameters, or in their operational control such as (but not limited to) blade pitch angle and turbine yaw angle, to limit acoustic emission at one or several locations of interest, such as nearby residential areas;

a system or method where the system of Surrogate wind turbines are modified in their position in the landscape, in their numbers, in their specification, in their features, in their adjustable operation parameters, or in their operational control, such as (but not limited to) blade pitch angle and turbine yaw angle, to satisfy a weighted balance of damage, power losses, or acoustic emissions;

a system where a representation of the Surrogate or Surrogates as disclosed is embedded within real-time control algorithms and hardware of an individual physical turbine;

a system where a representation of the Surrogate or Surrogates as disclosed is embedded within the real-time control algorithms and hardware of a control centre governing the operations of the individual turbines;

a system where a representation of the Surrogate or Surrogates as disclosed is embedded within the real-time control algorithms and hardware of a combination or partial combination of both individual physical turbines and of the control centre.

The disclosure includes the following clauses and embodiments:

1. A method, comprising:

generating a parameterization to define the geometry of a wind turbine;

executing a computational fluid dynamics (CFD) model using the defined geometry as an input to the CFD model, the CFD model generating an output representing a performance of the defined geometry;

optimizing the geometry of the wind turbine using the CFD model;

converting at least some of the data generated during the optimization of the wind turbine into a format for use in training a Deep Learning Neural Network (DLNN), the data including a plurality of input geometries for the wind turbine, together with the CFD model output associated with each input geometry;

training the Deep Learning Neural Network model, wherein the training data comprises at least some of the CFD model input geometries and CFD model outputs after conversion into the format for the Deep Learning Neural Network;

iteratively adjusting the Deep Learning Neural Network model to improve its accuracy, using a recursive process under control of an agent;

using an optimized geometry of the wind turbine obtained from the data generated using the CFD model as an input to the DLNN model;

performing further optimization of the geometry of the wind turbine using the DLNN model;

validating the performance of an optimized geometry obtained from the Deep Learning Neural Network model by evaluating the optimized geometry with the CFD model defining a layout for a set of N wind turbines in a wind farm;

arranging N single wind turbine DLNN models into a wind farm ensemble surrogate model based on the defined layout;

using the wind farm ensemble model to predict a total power output of the wind farm;

optimizing a layout for the wind farm by iteratively changing a position or specification for one or more of the wind turbines, subject to evaluation by a goal or objective; and using the wind farm ensemble surrogate model corresponding to the optimized layout for the wind farm as part of a control system for the wind farm.

2. The method of clause 1, wherein the steps of generating a parameterization to define the geometry of a wind turbine, executing a computational fluid dynamics (CFD) model using the defined geometry as an input to the CFD model, and optimizing the geometry of the wind turbine using the CFD model, are replaced by selecting one or more existing turbine configurations and using that configuration or configurations as inputs to a computational fluid dynamics (CFD) model, and instead of using an optimized geometry of a turbine in the subsequent steps, the selected existing turbine configurations are used and the optimizations are performed on the selected existing turbine configurations.

3. The method of clause 1, wherein optimizing the geometry of the wind turbine using the CFD model further comprises:

evaluating the CFD model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the CFD model and executing the CFD model;

evaluating the CFD model output by performing calculations related to the performance of the wind turbine; and repeating the preceding evaluating, providing, operating, and inputting until the evaluated performance is satisfactory.

4. The method of clause 1, wherein performing further optimization of the geometry of the wind turbine using the DLNN model further comprises;

evaluating the DLNN model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the DLNN model and executing the DLNN model;

evaluating the DLNN model output by performing calculations related to the performance of the wind turbine; and repeating the preceding evaluating, providing, operating, and inputting until the evaluated performance is satisfactory.

5. The method of clause 1, wherein instead of a CFD model, a Finite Element Analysis Simulation for Strength, Distortion, Impact, Forming, Extruding, Vibration, Material Properties, or Fatigue, a Finite Element Analysis Electro-Magnetic Simulation, a Finite Element or Finite Volume Acoustic Simulation, a Finite Element or Finite Volume Heat Transfer, a Finite Volume Chemical Simulation, a Mechanical System Multi-Body Simulation technique, or a combination of some or all these simulations is used.

6. The method of clause 1, wherein the optimization or further optimization of the geometry of the wind turbine is based on a performance parameter, and the performance parameter is one or more of drag, lift, force, moment, pressure, pressure drop, temperature, temperature drop, efficiency, resistance, momentum, velocity, acceleration, mass, an inertial characteristic, a thermal characteristic, a flow characteristic, a structural characteristic, a durability or reliability characteristic, a chemical characteristic, an acoustic characteristic, an electromagnetic characteristic, or a characteristic relevant for manufacturing.

7. The method of clause 1, wherein defining the layout for the set of N wind turbines in the wind farm further comprises defining the position of the N single wind turbine models in the wind farm and the specification or configuration for each of the N single wind turbines.

8. The method of clause 7, wherein the specification or configuration for each of the N single wind turbines comprises one or more of power, pitch, yaw, blade shape or height of each turbine.

9. The method of clause 1, wherein optimizing the layout for the wind farm further comprises using a machine learning optimizer, and wherein an optimal solution may include a constraint such as acoustic noise or structural strength.

10. The method of clause 1, wherein training the DLNN model further comprises training a plurality of different single wind turbine models based on data generated by the computational fluid dynamics model, the plurality of single wind turbine models having variations in one or more of blade design, nacelle or tower design, specification, or configuration.

11. The method of clause 1, wherein using the wind farm surrogate model as part of a control system for the wind farm further comprises one or more of varying the pitch or yaw angles of one or more wind turbines to optimize the wind farm output power or to reduce noise or stresses on components of the wind turbines.

12. A system, comprising:

one or more electronic processors configured to execute a set of computer-executable instructions; and one or more non-transitory electronic data storage media containing the set of computer-executable instructions, wherein when executed, the instructions cause the one or more electronic processors or a device or apparatus in which they are contained to generate a parameterization to define the geometry of a wind turbine;

execute a computational fluid dynamics (CFD) model using the defined geometry as an input to the CFD model, the CFD model generating an output representing a performance of the defined geometry;

optimize the geometry of the wind turbine using the CFD model;

convert at least some of the data generated during the optimization of the wind turbine into a format for use in training a Deep Learning Neural Network (DLNN), the data including a plurality of input geometries for the wind turbine, together with the CFD model output associated with each input geometry;

train the Deep Learning Neural Network model, wherein the training data comprises at least some of the CFD model input geometries and CFD model outputs after conversion into the format for the Deep Learning Neural Network;

iteratively adjust the Deep Learning Neural Network model to improve its accuracy, using a recursive process under control of an agent;

use an optimized geometry of the wind turbine obtained from the data generated using the CFD model as an input to the DLNN model;

perform further optimization of the geometry of the wind turbine using the DLNN model;

validate the performance of an optimized geometry obtained from the Deep Learning Neural Network model by evaluating the optimized geometry with the CFD model define a layout for a set of N wind turbines in a wind farm;

arrange N single wind turbine DLNN models into a wind farm ensemble surrogate model based on the defined layout;

use the wind farm ensemble model to predict a total power output of the wind farm;

optimize a layout for the wind farm by iteratively changing a position or specification for one or more of the wind turbines, subject to evaluation by a goal or objective; and use the wind farm ensemble surrogate model corresponding to the optimized layout for the wind farm as part of a control system for the wind farm.

13. The system of clause 12, wherein the steps of generating a parameterization to define the geometry of a wind turbine, executing a computational fluid dynamics (CFD) model using the defined geometry as an input to the CFD model, and optimizing the geometry of the wind turbine using the CFD model, are replaced by selecting one or more existing turbine configurations and using that configuration or configurations as inputs to a computational fluid dynamics (CFD) model, and instead of using an optimized geometry of a turbine in the subsequent steps, the selected existing turbine configurations are used and the optimizations are performed on the selected existing turbine configurations.

14. The system of clause 12, wherein optimizing the geometry of the wind turbine using the CFD model further comprises:

evaluating the CFD model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the CFD model and executing the CFD model;

evaluating the CFD model output by performing calculations related to the performance of the wind turbine; and repeating the preceding evaluating, providing, operating, and inputting until the evaluated performance is satisfactory.

15. The system of clause 12, wherein performing further optimization of the geometry of the wind turbine using the DLNN model further comprises;

evaluating the DLNN model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the DLNN model and executing the DLNN model;

evaluating the DLNN model output by performing calculations related to the performance of the wind turbine; and repeating the preceding evaluating, providing, operating, and inputting until the evaluated performance is satisfactory.

16. The system of clause 12, wherein instead of a CFD model, a Finite Element Analysis Simulation for Strength, Distortion, Impact, Forming, Extruding, Vibration, Material Properties, or Fatigue, a Finite Element Analysis Electro-Magnetic Simulation, a Finite Element or Finite Volume Acoustic Simulation, a Finite Element or Finite Volume Heat Transfer, a Finite Volume Chemical Simulation, a Mechanical System Multi-Body Simulation technique, or a combination of some or all these simulations is used.

17. The system of clause 12, wherein defining the layout for the set of N wind turbines in the wind farm further comprises defining the position of the N single wind turbine models in the wind farm and the specification or configuration for each of the N single wind turbines.

18. One or more non-transitory computer-readable media comprising a set of computer-executable instructions that when executed by one or more programmed electronic processors, cause the processors or a device or apparatus in which they are contained to generate a parameterization to define the geometry of a wind turbine;

execute a computational fluid dynamics (CFD) model using the defined geometry as an input to the CFD model, the CFD model generating an output representing a performance of the defined geometry;

optimize the geometry of the wind turbine using the CFD model;

convert at least some of the data generated during the optimization of the wind turbine into a format for use in training a Deep Learning Neural Network (DLNN), the data including a plurality of input geometries for the wind turbine, together with the CFD model output associated with each input geometry;

train the Deep Learning Neural Network model, wherein the training data comprises at least some of the CFD model input geometries and CFD model outputs after conversion into the format for the Deep Learning Neural Network;

iteratively adjust the Deep Learning Neural Network model to improve its accuracy, using a recursive process under control of an agent;

use an optimized geometry of the wind turbine obtained from the data generated using the CFD model as an input to the DLNN model;

perform further optimization of the geometry of the wind turbine using the DLNN model;

validate the performance of an optimized geometry obtained from the Deep Learning Neural Network model by evaluating the optimized geometry with the CFD model define a layout for a set of N wind turbines in a wind farm;

arrange N single wind turbine DLNN models into a wind farm ensemble surrogate model based on the defined layout;

use the wind farm ensemble model to predict a total power output of the wind farm;

optimize a layout for the wind farm by iteratively changing a position or specification for one or more of the wind turbines, subject to evaluation by a goal or objective; and use the wind farm ensemble surrogate model corresponding to the optimized layout for the wind farm as part of a control system for the wind farm.

19. The one or more non-transitory computer-readable media of clause 18, wherein the steps of generating a parameterization to define the geometry of a wind turbine, executing a computational fluid dynamics (CFD) model using the defined geometry as an input to the CFD model, and optimizing the geometry of the wind turbine using the CFD model, are replaced by selecting one or more existing turbine configurations and using that configuration or configurations as inputs to a computational fluid dynamics (CFD) model, and instead of using an optimized geometry of a turbine in the subsequent steps, the selected existing turbine configurations are used and the optimizations are performed on the selected existing turbine configurations.

20. The one or more non-transitory computer-readable media of clause 18, wherein optimizing the geometry of the wind turbine using the CFD model further comprises:

evaluating the CFD model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the CFD model and executing the CFD model;

evaluating the CFD model output by performing calculations related to the performance of the wind turbine; and repeating the preceding evaluating, providing, operating, and inputting until the evaluated performance is satisfactory;

and wherein performing further optimization of the geometry of the wind turbine using the DLNN model further comprises evaluating the DLNN model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the DLNN model and executing the DLNN model;

evaluating the DLNN model output by performing calculations related to the performance of the wind turbine; and repeating the preceding evaluating, providing, operating, and inputting until the evaluated performance is satisfactory.

The disclosed system and methods can be implemented in the form of control logic using computer software in a modular or integrated manner. Based on the disclosure and teachings provided herein, a person of ordinary skill in the art will know and appreciate other ways and/or methods to implement the disclosure using hardware and a combination of hardware and software.

Machine learning (ML) and Deep Learning (DL) are being used more and more to enable the analysis of data and assist in making decisions in multiple industries. To benefit from using machine learning or deep learning, a machine learning or deep learning algorithm is applied to a set of training data and labels to generate a "model" which represents what the application of the algorithm has "learned" from the training data. Each element (or instances or example, in the form of one or more parameters, variables, characteristics or "features") of the set of training data is associated with a label or annotation that defines how the element should be classified by the trained model.

A machine learning model or deep learning model in the form of a neural network is a set of layers of connected neurons that operate to make a decision (such as a classification) regarding a sample of input data. When trained (i.e., the weights connecting neurons have converged using a gradient descent or other algorithm), the model will operate on a new element of input data to generate the correct label or classification as an output.

In some embodiments, certain of the methods, models or functions disclosed and/or described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. A trained neural network, trained machine learning model, or any other form of decision or classification process may be used to implement one or more of the methods, functions, processes, or operations disclosed and/or described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" or nodes that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses methods to iteratively determine the weights for intermediate and final feature neurons. In terms of a computational model, in one example, each neuron calculates the dot product of inputs and weights, adds the bias, and applies a non-linear trigger or activation function (for example, using a sigmoid response function).

Any of the software components, processes or functions disclosed and/or described in this application may be implemented as software code to be executed by a processor using a suitable computer language such as Python, Java, JavaScript, C, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as a display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not limited to the disclosed implementations. Instead, the disclosed and/or described implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable a person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein.

Methods described herein can be performed in any suitable order unless otherwise indicated herein or clearly contradicted by context. The use of all examples or exemplary language (e.g., "such as") provided herein, is intended merely to better illuminate embodiments of the disclosure and does not pose a limitation to the scope of the invention unless otherwise claimed. No language in the specification should be construed as indicating any non-claimed element as essential to each embodiment of the present invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this specification. Accordingly, the embodiments are not limited to the embodiments described above or depicted in the drawings, and various embodiments and modifications can be made without departing from the scope of the claims below.

That which is claimed is:

1. A method, comprising:

generating a parameterization to define the geometry of a wind turbine;

executing a computational fluid dynamics (CFD) model using the defined geometry as an input to the CFD model, the CFD model generating an output representing a performance of the defined geometry;

optimizing the geometry of the wind turbine using the CFD model;

converting at least some of the data generated during the optimization of the wind turbine into a format for use in training a Deep Learning Neural Network (DLNN), the data including a plurality of input geometries for the wind turbine, together with the CFD model output associated with each input geometry;

training the Deep Learning Neural Network model, wherein the training data comprises at least some of the CFD model input geometries and CFD model outputs after conversion into the format for the Deep Learning Neural Network;

iteratively adjusting the Deep Learning Neural Network model to improve its accuracy, using a recursive process under control of an agent;

using an optimized geometry of the wind turbine obtained from the data generated using the CFD model as an input to the DLNN model;

performing further optimization of the geometry of the wind turbine using the DLNN model;

validating the performance of an optimized geometry obtained from the Deep Learning Neural Network model by evaluating the optimized geometry with the CFD model defining a layout for a set of N wind turbines in a wind farm;

arranging N single wind turbine DLNN models into a wind farm ensemble surrogate model based on the defined layout;

using the wind farm ensemble model to predict a total power output of the wind farm;

optimizing a layout for the wind farm by iteratively changing a position or specification for one or more of the wind turbines, subject to evaluation by a goal or objective; and using the wind farm ensemble surrogate model corresponding to the optimized layout for the wind farm as part of a control system for the wind farm.

2. The method of claim 1, wherein the steps of generating a parameterization to define the geometry of a wind turbine, executing a computational fluid dynamics (CFD) model using the defined geometry as an input to the CFD model, and optimizing the geometry of the wind turbine using the CFD model, are replaced by selecting one or more existing turbine configurations and using that configuration or configurations as inputs to a computational fluid dynamics (CFD) model, and instead of using an optimized geometry of a turbine in the subsequent steps, the selected existing turbine configurations are used and the optimizations are performed on the selected existing turbine configurations.

3. The method of claim 1, wherein optimizing the geometry of the wind turbine using the CFD model further comprises:

evaluating the CFD model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the CFD model and executing the CFD model;

evaluating the CFD model output by performing calculations related to the performance of the wind turbine; and repeating the preceding evaluating, providing, operating, and inputting until the evaluated performance is satisfactory.

4. The method of claim 1, wherein performing further optimization of the geometry of the wind turbine using the DLNN model further comprises;

evaluating the DLNN model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the DLNN model and executing the DLNN model;

evaluating the DLNN model output by performing calculations related to the performance of the wind turbine; and repeating the preceding evaluating, providing, operating, and inputting until the evaluated performance is satisfactory.

5. The method of claim 1, wherein instead of a CFD model, a Finite Element Analysis Simulation for Strength, Distortion, Impact, Forming, Extruding, Vibration, Material Properties, or Fatigue, a Finite Element Analysis Electro-Magnetic Simulation, a Finite Element or Finite Volume Acoustic Simulation, a Finite Element or Finite Volume Heat Transfer, a Finite Volume Chemical Simulation, a Mechanical System Multi-Body Simulation technique, or a combination of some or all these simulations is used.

6. The method of claim 1, wherein the optimization or further optimization of the geometry of the wind turbine is based on a performance parameter, and the performance parameter is one or more of drag, lift, force, moment, pressure, pressure drop, temperature, temperature drop, efficiency, resistance, momentum, velocity, acceleration, mass, an inertial characteristic, a thermal characteristic, a flow characteristic, a structural characteristic, a durability or reliability characteristic, a chemical characteristic, an acoustic characteristic, an electromagnetic characteristic, or a characteristic relevant for manufacturing.

7. The method of claim 1, wherein defining the layout for the set of N wind turbines in the wind farm further comprises defining the position of the N single wind turbine models in the wind farm and the specification or configuration for each of the N single wind turbines.

8. The method of claim 7, wherein the specification or configuration for each of the N single wind turbines comprises one or more of power, pitch, yaw, blade shape or height of each turbine.

9. The method of claim 1, wherein optimizing the layout for the wind farm further comprises using a machine learning optimizer, and wherein an optimal solution may include a constraint such as acoustic noise or structural strength.

10. The method of claim 1, wherein training the DLNN model further comprises training a plurality of different single wind turbine models based on data generated by the computational fluid dynamics model, the plurality of single wind turbine models having variations in one or more of blade design, nacelle or tower design, specification, or configuration.

11. The method of claim 1, wherein using the wind farm surrogate model as part of a control system for the wind farm further comprises one or more of varying the pitch or yaw angles of one or more wind turbines to optimize the wind farm output power or to reduce noise or stresses on components of the wind turbines.

12. A system, comprising:
- one or more electronic processors configured to execute a set of computer-executable instructions; and
- one or more non-transitory electronic data storage media containing the set of computer-executable instructions, wherein when executed, the instructions cause the one or more electronic processors or a device or apparatus in which they are contained to
  - generate a parameterization to define the geometry of a wind turbine;
  - execute a computational fluid dynamics (CFD) model using the defined geometry as an input to the CFD model, the CFD model generating an output representing a performance of the defined geometry;
  - optimize the geometry of the wind turbine using the CFD model;
  - convert at least some of the data generated during the optimization of the wind turbine into a format for use in training a Deep Learning Neural Network (DLNN), the data including a plurality of input geometries for the wind turbine, together with the CFD model output associated with each input geometry;
  - train the Deep Learning Neural Network model, wherein the training data comprises at least some of the CFD model input geometries and CFD model outputs after conversion into the format for the Deep Learning Neural Network;
  - iteratively adjust the Deep Learning Neural Network model to improve its accuracy, using a recursive process under control of an agent;
  - use an optimized geometry of the wind turbine obtained from the data generated using the CFD model as an input to the DLNN model;
  - perform further optimization of the geometry of the wind turbine using the DLNN model;
  - validate the performance of an optimized geometry obtained from the Deep Learning Neural Network model by evaluating the optimized geometry with the CFD model
  - define a layout for a set of N wind turbines in a wind farm;
  - arrange N single wind turbine DLNN models into a wind farm ensemble surrogate model based on the defined layout;
  - use the wind farm ensemble model to predict a total power output of the wind farm;
  - optimize a layout for the wind farm by iteratively changing a position or specification for one or more of the wind turbines, subject to evaluation by a goal or objective; and
  - use the wind farm ensemble surrogate model corresponding to the optimized layout for the wind farm as part of a control system for the wind farm.

13. The system of claim 12, wherein the steps of generating a parameterization to define the geometry of a wind turbine, executing a computational fluid dynamics (CFD) model using the defined geometry as an input to the CFD model, and optimizing the geometry of the wind turbine using the CFD model, are replaced by selecting one or more existing turbine configurations and using that configuration or configurations as inputs to a computational fluid dynamics (CFD) model, and instead of using an optimized geometry of a turbine in the subsequent steps, the selected existing turbine configurations are used and the optimizations are performed on the selected existing turbine configurations.

14. The system of claim 12, wherein optimizing the geometry of the wind turbine using the CFD model further comprises:
- evaluating the CFD model output by performing calculations related to the performance of the wind turbine;
- providing the wind turbine's performance and the wind turbine's geometry as inputs to a machine learning optimizer;
- operating the machine learning optimizer to generate a new geometry for the wind turbine;
- inputting the new geometry into the CFD model and executing the CFD model;
- evaluating the CFD model output by performing calculations related to the performance of the wind turbine; and
- repeating the preceding evaluating, providing, operating, and inputting until the evaluated performance is satisfactory.

15. The system of claim 12, wherein performing further optimization of the geometry of the wind turbine using the DLNN model further comprises;
- evaluating the DLNN model output by performing calculations related to the performance of the wind turbine;
- providing the wind turbine's performance and the wind turbine's geometry as inputs to a machine learning optimizer;
- operating the machine learning optimizer to generate a new geometry for the wind turbine;

inputting the new geometry into the DLNN model and executing the DLNN model;

evaluating the DLNN model output by performing calculations related to the performance of the wind turbine; and repeating the preceding evaluating, providing, operating, and inputting until the evaluated performance is satisfactory.

16. The system of claim 12, wherein instead of a CFD model, a Finite Element Analysis Simulation for Strength, Distortion, Impact, Forming, Extruding, Vibration, Material Properties, or Fatigue, a Finite Element Analysis Electro-Magnetic Simulation, a Finite Element or Finite Volume Acoustic Simulation, a Finite Element or Finite Volume Heat Transfer, a Finite Volume Chemical Simulation, a Mechanical System Multi-Body Simulation technique, or a combination of some or all these simulations is used.

17. The system of claim 12, wherein defining the layout for the set of N wind turbines in the wind farm further comprises defining the position of the N single wind turbine models in the wind farm and the specification or configuration for each of the N single wind turbines.

18. One or more non-transitory computer-readable media comprising a set of computer-executable instructions that when executed by one or more programmed electronic processors, cause the processors or a device or apparatus in which they are contained to generate a parameterization to define the geometry of a wind turbine;

execute a computational fluid dynamics (CFD) model using the defined geometry as an input to the CFD model, the CFD model generating an output representing a performance of the defined geometry;

optimize the geometry of the wind turbine using the CFD model;

convert at least some of the data generated during the optimization of the wind turbine into a format for use in training a Deep Learning Neural Network (DLNN), the data including a plurality of input geometries for the wind turbine, together with the CFD model output associated with each input geometry;

train the Deep Learning Neural Network model, wherein the training data comprises at least some of the CFD model input geometries and CFD model outputs after conversion into the format for the Deep Learning Neural Network;

iteratively adjust the Deep Learning Neural Network model to improve its accuracy, using a recursive process under control of an agent;

use an optimized geometry of the wind turbine obtained from the data generated using the CFD model as an input to the DLNN model;

perform further optimization of the geometry of the wind turbine using the DLNN model;

validate the performance of an optimized geometry obtained from the Deep Learning Neural Network model by evaluating the optimized geometry with the CFD model define a layout for a set of N wind turbines in a wind farm;

arrange N single wind turbine DLNN models into a wind farm ensemble surrogate model based on the defined layout;

use the wind farm ensemble model to predict a total power output of the wind farm;

optimize a layout for the wind farm by iteratively changing a position or specification for one or more of the wind turbines, subject to evaluation by a goal or objective; and use the wind farm ensemble surrogate model corresponding to the optimized layout for the wind farm as part of a control system for the wind farm.

19. The one or more non-transitory computer-readable media of claim 18, wherein the steps of generating a parameterization to define the geometry of a wind turbine, executing a computational fluid dynamics (CFD) model using the defined geometry as an input to the CFD model, and optimizing the geometry of the wind turbine using the CFD model, are replaced by selecting one or more existing turbine configurations and using that configuration or configurations as inputs to a computational fluid dynamics (CFD) model, and instead of using an optimized geometry of a turbine in the subsequent steps, the selected existing turbine configurations are used and the optimizations are performed on the selected existing turbine configurations.

20. The one or more non-transitory computer-readable media of claim 18, wherein optimizing the geometry of the wind turbine using the CFD model further comprises:

evaluating the CFD model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the CFD model and executing the CFD model;

evaluating the CFD model output by performing calculations related to the performance of the wind turbine; and repeating the preceding evaluating, providing, operating, and inputting until the evaluated performance is satisfactory;

and wherein performing further optimization of the geometry of the wind turbine using the DLNN model further comprises evaluating the DLNN model output by performing calculations related to the performance of the wind turbine;

providing the wind turbine's performance and the wind turbine's geometry as inputs to a machine learning optimizer;

operating the machine learning optimizer to generate a new geometry for the wind turbine;

inputting the new geometry into the DLNN model and executing the DLNN model;

evaluating the DLNN model output by performing calculations related to the performance of the wind turbine; and repeating the preceding evaluating, providing, operating, and inputting until the evaluated performance is satisfactory.

* * * * *